US012175605B2

(12) United States Patent
Brown et al.

(10) Patent No.: US 12,175,605 B2
(45) Date of Patent: Dec. 24, 2024

(54) SITUATIONAL-RISK-BASED AR DISPLAY

(71) Applicant: Snap Inc., Santa Monica, CA (US)

(72) Inventors: Edmund Graves Brown, Los Angeles, CA (US); Benjamin Lucas, San Francisco, CA (US); Jonathan M. Rodriguez, II, La Habra, CA (US); Richard Zhuang, San Diego, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/700,733

(22) Filed: Mar. 22, 2022

(65) Prior Publication Data

US 2023/0306690 A1 Sep. 28, 2023

(51) Int. Cl.
*G06T 19/00* (2011.01)
*G06T 3/20* (2006.01)
*G06T 3/40* (2024.01)

(52) U.S. Cl.
CPC .............. *G06T 19/006* (2013.01); *G06T 3/20* (2013.01); *G06T 3/40* (2013.01); *G06T 2207/30248* (2013.01)

(58) Field of Classification Search
CPC ......... G06T 19/006; G06T 2207/30248; G06T 2207/30261; G06T 3/20; G06T 3/40; G06F 3/011
See application file for complete search history.

(56) References Cited

U.S. PATENT DOCUMENTS 10,496,104 B1 * 12/2019 Liu ...................... G07C 5/0816
10,766,498 B2    9/2020 Kleen et al.
2010/0253593 A1 10/2010 Seder et al.
2014/0098136 A1  4/2014 Fein et al.
2015/0179066 A1 * 6/2015 Rider ..................... G08G 1/165
                                                          701/31.5
2016/0048203 A1  2/2016 Blum et al.
2017/0101056 A1  4/2017 Park
2017/0287217 A1 10/2017 Kim et al.
2018/0090007 A1  3/2018 Takemori et al.
(Continued)

FOREIGN PATENT DOCUMENTS

CA      3031771 A1 *  2/2018 ............. A61B 3/113
CN    106648108 B  *  3/2020 ............. B60K 35/00
(Continued)

OTHER PUBLICATIONS

"International Application Serial No. PCT/US2022/045043, Written Opinion mailed Jan. 25, 2023", 8 pgs.
(Continued)

*Primary Examiner* — Chante E Harrison
(74) *Attorney, Agent, or Firm* — Schwegman Lundberg & Woessner, P.A.

(57) ABSTRACT

Content is displayed to a user of augmented reality device. In response to receiving an indication of an increased level of risk, the degree of content being displayed to the user is reduced. The indication of increased level of risk may be generated by or received from an associated transportation device. The adjustment of the display of the degree of content may include moving one or more content elements out of a central field of view of the augmented reality device, reducing the size or visual characteristics of a content element, or eliminating a content element from the display.

20 Claims, 13 Drawing Sheets

(56) References Cited

U.S. PATENT DOCUMENTS

| | | |
|---|---|---|
| 2018/0096604 A1 | 4/2018 | Morimura et al. |
| 2018/0157036 A1* | 6/2018 | Choi .................. G02B 27/0179 |
| 2018/0189568 A1 | 7/2018 | Powderly et al. |
| 2018/0276969 A1* | 9/2018 | Obaidi .................... G06V 20/20 |
| 2018/0286268 A1 | 10/2018 | Ni |
| 2019/0049968 A1 | 2/2019 | Dean et al. |
| 2019/0172262 A1 | 6/2019 | Mchugh et al. |
| 2020/0019782 A1 | 1/2020 | Narayanaswami et al. |
| 2020/0056892 A1 | 2/2020 | Haque et al. |
| 2020/0073527 A1* | 3/2020 | Bandishti .............. G06F 3/0487 |
| 2020/0089956 A1 | 3/2020 | Alalusi |
| 2020/0363216 A1 | 11/2020 | Elvanoglu |
| 2020/0369149 A1 | 11/2020 | Kassner et al. |
| 2021/0012113 A1 | 1/2021 | Petill et al. |
| 2021/0072817 A1 | 3/2021 | Bond et al. |
| 2021/0088784 A1 | 3/2021 | Whitmire et al. |
| 2021/0146945 A1 | 5/2021 | Brown et al. |
| 2021/0241723 A1* | 8/2021 | Tucker ..................... B60Q 9/00 |
| 2022/0237878 A1* | 7/2022 | Tartz ...................... G06V 20/00 |
| 2022/0289176 A1 | 9/2022 | Baek |
| 2023/0088065 A1 | 3/2023 | Dudar |
| 2023/0098451 A1* | 3/2023 | Brown ................ G06F 3/04817 |
| | | 701/93 |
| 2023/0105428 A1* | 4/2023 | Brown ................... G06V 20/20 |
| | | 345/633 |
| 2023/0115501 A1 | 4/2023 | Mu et al. |
| 2023/0401873 A1 | 12/2023 | Moll et al. |

FOREIGN PATENT DOCUMENTS

| | | | |
|---|---|---|---|
| CN | 110892451 A * | 3/2020 | ............... B60R 1/00 |
| DE | 102013217558 A1 | 3/2015 | |
| DE | 102019202576 A1 | 8/2020 | |
| EP | 3137975 A1 | 3/2017 | |
| EP | 3184365 A2 | 6/2017 | |
| EP | 3454013 A1 * | 3/2019 | ............. B60K 35/00 |
| EP | 3577606 B1 * | 9/2022 | ............. B60K 35/00 |
| KR | 20120133309 | 12/2012 | |
| WO | WO-2017095790 A1 * | 6/2017 | ............. B60K 35/00 |
| WO | WO-2018217498 A1 * | 11/2018 | ........ B60W 50/0097 |
| WO | WO-2020212808 A1 | 10/2020 | |
| WO | WO-2023009580 A2 * | 2/2023 | |
| WO | WO-2023055803 A1 | 4/2023 | |
| WO | WO-2023183314 A1 | 9/2023 | |
| WO | 2023244924 | 12/2023 | |

OTHER PUBLICATIONS

"International Application Serial No. PCT/US2023/015789, Written Opinion mailed Jun. 22, 2023", 6 pgs.

"International Application Serial No. PCT/US2022/045043, International Search Report mailed Jan. 25, 2023", 4 pgs.

"U.S. Appl. No. 17/490,915, Non Final Office Action mailed Nov. 21, 2023", 11 pgs.

* cited by examiner

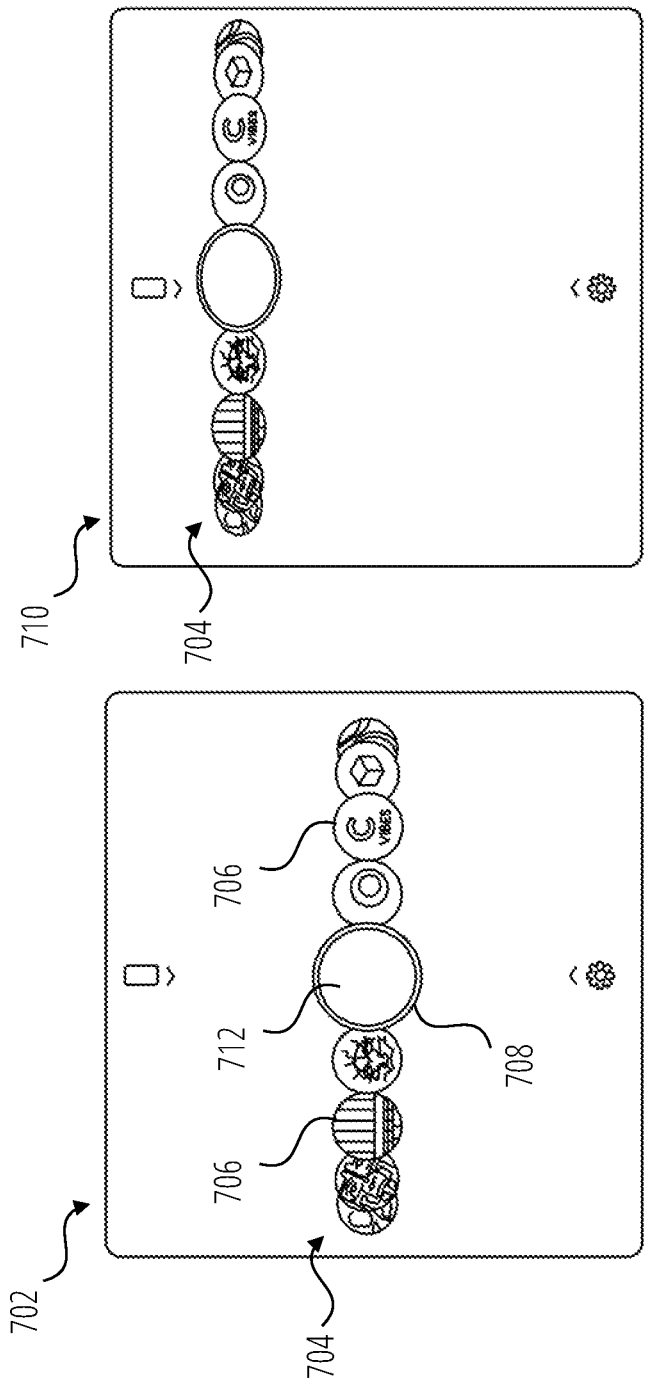

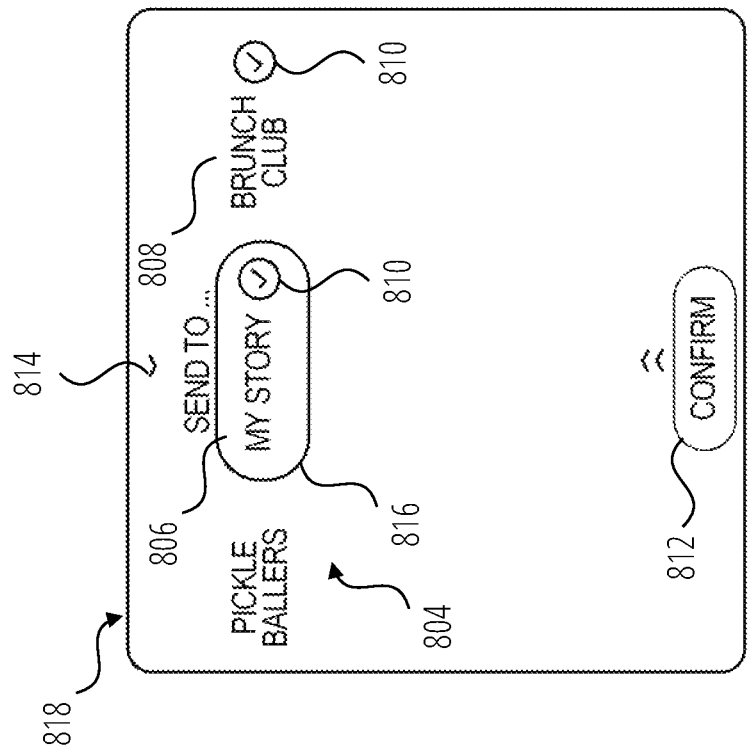
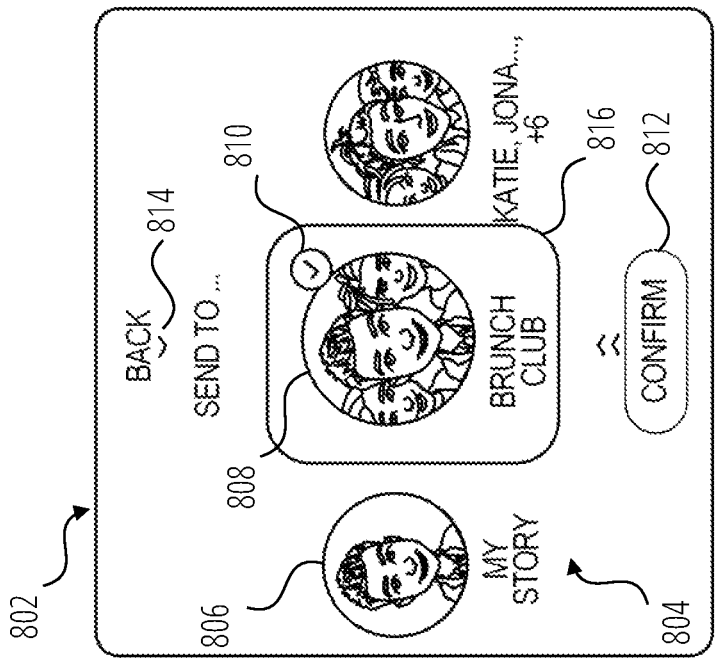
FIG. 8B
FIG. 8A

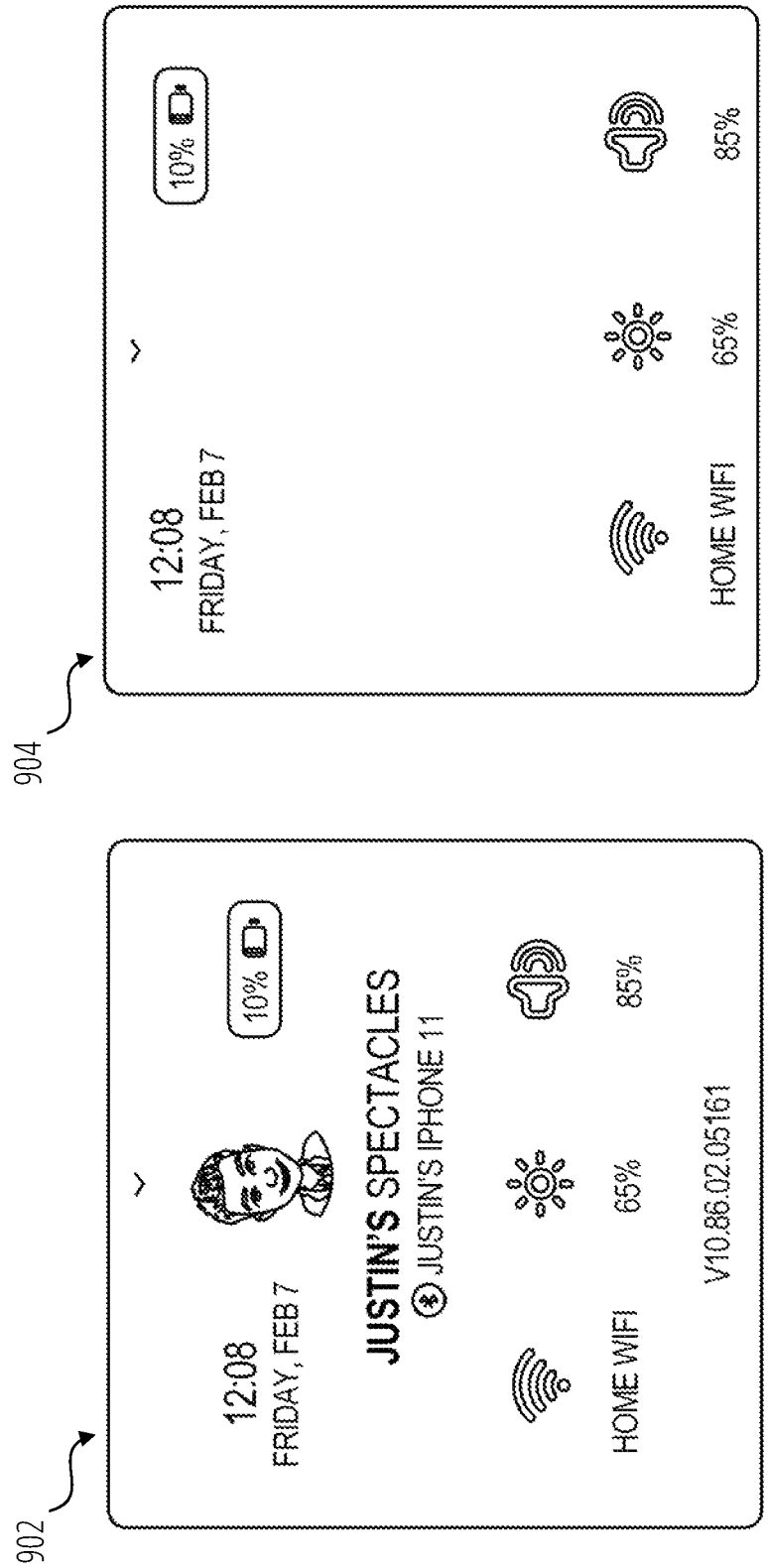

SITUATIONAL-RISK-BASED AR DISPLAY

TECHNICAL FIELD

The present disclosure relates generally to wearable devices with displays for augmented or virtual reality (an "AR wearable device"). In some examples, the present disclosure relates to interactions between a personal mobility device and a head-worn augmented reality device.

BACKGROUND

An increasing focus on the development of alternative modes of transportation, in addition to ride sharing platforms has led to an explosion in the diversity and availability of personal mobility systems. A PM system encompasses all modes of powered (electric powered or otherwise) personal transportation capable of transporting a user (and sometimes a passenger) from one place to another. A PM system includes but is not limited to, powered scooters, bicycles, skateboards, unicycles, kayaks, paddleboards, and surfboards. Powered bicycles and scooters are sometimes referred to as e-bikes and e-scooters, respectively. Powered personal transportation may also include cars, trucks, motorcycles, and boats. In addition to the physical dexterity and agility required to operate them, e-scooters, e-bikes, and self-balancing electric scooters (e.g., Segway® Ninebot) present operational challenges and safety risks that require a higher level of user concentration and ability in order to operate safely. The meteoric rise in the density of PM systems in urban environments coupled with a general lack of user training and a highly cluttered and dynamic operating environment has led to a sharp rise in accidents and hospitalizations.

PM systems are typically designed with few controls, almost no performance feedback indicators or extremely limited in such capabilities (e.g., LED or LCD battery or speed indicators), and no obstacle detection or avoidance systems. Because of the bare-bones nature of PM systems it may not be feasible or safe to incorporate additional controls or performance indicators.

AR wearable devices, on the other hand, may be implemented with transparent or semi-transparent displays through which the user can view the surrounding environment. Such devices enable a user to see through the transparent or semi-transparent display to view the surrounding physical environment, and to also see objects (e.g., virtual objects such as 3D (three dimensional) renderings, images, video, text, and so forth) that are generated for display to appear as a part of, and/or overlaid upon, the physical environment. This is typically referred to as "augmented reality."

AR wearable devices may completely occlude a user's visual field and display a virtual environment through which a user may move or be moved. This is typically referred to as "virtual reality." As used herein, the term "augmented reality" or "AR" refers to both augmented reality and virtual reality as traditionally understood, unless the context indicates otherwise.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in the reference number refer to the figure number in which that element is first introduced. Some nonlimiting examples are illustrated in the figures of the accompanying drawings in which:

FIG. 7A illustrates a user interface screen displayed by the glasses of FIG. 1 in accordance with some examples.

FIG. 7B illustrates a user interface screen of FIG. 7A after an increased risk level or unsafe condition has been detected or signaled, according to some examples.

FIG. 8A illustrates a user interface screen displayed by the glasses of FIG. 1 in accordance with some examples.

FIG. 8B illustrates the user interface screen of FIG. 8A after an increased risk level or unsafe condition has been detected or signaled, according to some examples.

FIG. 9A illustrates a user interface screen displayed by the glasses of FIG. 1 in accordance with some examples.

FIG. 9B illustrates the user interface screen of FIG. 9A after an increased risk level or unsafe condition has been detected or signaled, according to some examples.

DETAILED DESCRIPTION

Figure 1:
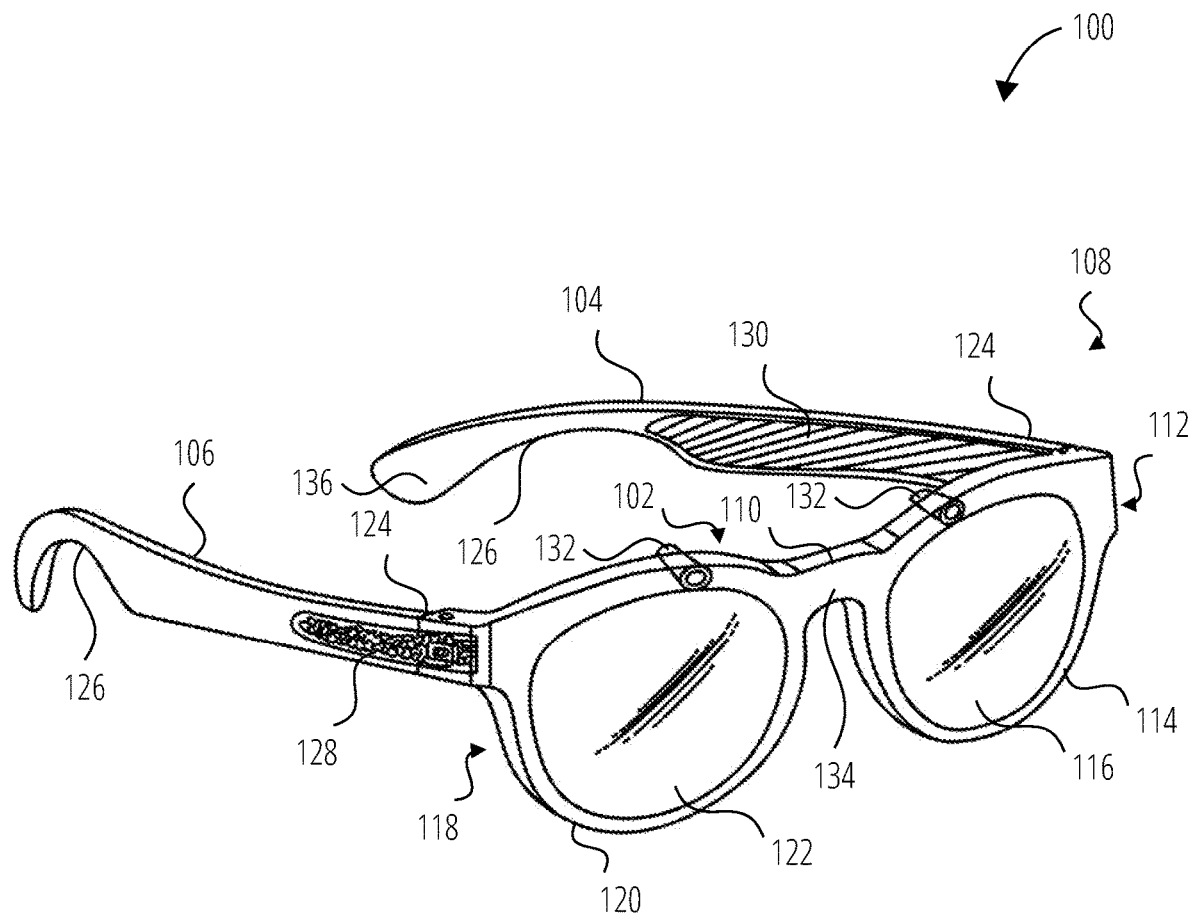
FIG. 1 is a perspective view of a wearable device, in accordance with some examples.

The description that follows describes systems, methods, techniques, instruction sequences, and computing machine program products that illustrate examples of the present subject matter. In the following description, for purposes of explanation, numerous specific details are set forth in order to provide an understanding of various examples of the present subject matter. It will be evident, however, to those skilled in the art, that examples of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The disclosure herein generally relates to the adjustment of the information or effects displayed by a head-worn device based on recognition of a situation of possibly-elevated risk. This permits a clearer field of view for the user to address the situation that triggered the recognition of the real or potential situation of elevated risk. In some examples, the information that is displayed is moved out of the central field of view while keeping the peripheral vision clear. This can be achieved by moving information up or down in the field of view, by eliminating less important information, by changing the size and graphical properties of the information, and so forth. The detection or notification of the increased level of risk may be performed by an associated transportation device, such as a scooter or other PM system being used or occupied by the user of the head-worn device system.

In some examples, a method, performed by one or more computer processors, is provided for displaying content using an augmented reality device, the method including displaying a first degree of content using the augmented reality device, receiving an indication of an increased level of risk, and displaying a second degree of content using the augmented reality device, the second degree of content being less than the first degree of content.

The indication of increased level of risk may be generated by a transportation device and further include receiving a notification of an increased level of risk from the transportation device. Displaying of the second degree of content may include moving one or more content elements out of a central field of view of the augmented reality device, reducing a size or a visual characteristic of a content element shown in the display of the first degree of content, or eliminating a content element shown in the display of the first degree of content. Moving of the one or contents out of the central field of view may include moving one or more content elements upwards or downwards in the field of view of the augmented reality device.

The method may also include detecting a manipulation of a control of the transportation device, and based on the detection of the manipulation of the control device, transmitting the indication of the increased level of risk.

In some examples, provided is a computing apparatus for displaying content using an augmented reality device, the computing apparatus includes one or more computer processors and one or more memories storing instructions that, when executed by the one or more computer processors, configure the computing apparatus to perform operations for displaying content using an augmented reality device corresponding to any of the methods and limitations described above, including but not limited to displaying a first degree of content using the augmented reality device, receiving an indication of an increased level of risk, and displaying a second degree of content using the augmented reality device, the second degree of content being less than the first degree of content.

In some examples, provided is a non-transitory computer-readable storage medium, the computer-readable storage medium including instructions that when executed by one or more computer processors of one or more computing devices, cause the one or more computing devices to perform operations for displaying content using an augmented reality device corresponding to any of the methods and limitations described above, including but not limited to displaying a first degree of content using the augmented reality device, receiving an indication of an increased level of risk, and displaying a second degree of content using the augmented reality device, the second degree of content being less than the first degree of content.

Other technical features may be readily apparent to one skilled in the art from the following figures, descriptions, and claims.

Integration of AR wearable devices with PM systems can improve the user experience and mitigate safety risks by lessening the cognitive burden placed on the user. AR wearable devices can not only centralize and display telemetry data and navigation information into the user's field of view but can detect physical obstacles or interact with virtual objects to modulate the performance of the PM system. The AR wearable device can detect and highlight obstacles, traffic control devices, and hazards to warn the user of their presence. The AR wearable device can also use sensors contained within the PM system to further inform or modify the information being perceived by the user and the performance characteristics of the PM system.

PM systems, such as powered scooters and e-bikes, typically include a power source (such as a battery), a propulsion source (such as a motor or engine), user controls, an independent braking system, and a management system. Some PM systems may also include radio communications systems (such as cellular, WiFi®, and Bluetooth® transponders) and location systems (e.g., GPS). PM systems may further include sensing technologies such as cameras, sonar sensors, radar sensors, laser sensors, lidar sensors, hear rate sensors, and inertial measurement units ("IMUs," such as accelerometers, gyroscopes, and magnetometers). Although described with reference to PM systems, the methods described herein may be used in some examples with any transportation device, including but not limited to non-powered bicycles, cars and motorcycles.

Some PM systems include a braking system that may be connected to the management system and is intended to safely stop the PM system during emergencies, in addition to braking during normal operation. The braking system may also be part of a regenerative braking system involving the propulsion source, the management system, and the power source.

Typical operation of a PM system involves transmitting inputs effected by the user on the user controls to the management system; the management system will then control the delivery of power from the power source to the propulsion source to achieve the desired action by the user.

On the other hand, AR wearable devices, such as AR spectacles or AR glasses, include a transparent or semi-transparent display that enables a user to see through the transparent or semi-transparent display to view the surrounding environment. Additional information or objects (e.g., virtual objects such as 3D renderings, images, video, text, and so forth) are shown on the display and appear as a part of, and/or overlaid upon, the surrounding environment to provide an augmented reality experience for the user. The display may for example include a waveguide that receives a light beam from a projector but any appropriate display for presenting augmented or virtual content to the wearer may be used. Like some PM systems, AR wearable devices may also include radio communications systems (such as cellular, WiFi®, and Bluetooth® transponders) and location systems (e.g., GPS), camera, and IMU sensors.

As referred to herein, the phrases "augmented reality experience" includes or refers to various image processing operations corresponding to an image modification, filter, media overlay, transformation, and the like, as described further herein. In some examples, these image processing operations provide an interactive experience of a real-world environment, where objects, surfaces, backgrounds, lighting and so forth, in the real world are enhanced by computer-generated perceptual information. In this context an "augmented reality effect" comprises the collection of data, parameters, and other assets needed to apply a selected augmented reality experience to an image or a video feed. In some examples, augmented reality effects are provided by Snap, Inc. under the registered trademark LENSES.

The rendering of the virtual objects by the AR wearable head-worn device systems may be based on a position of the AR wearable device relative to a physical object or relative to a fixed frame of reference (external to the AR wearable device) so that the virtual object correctly appears in the display. As an example, the AR wearable device may render a virtual object associated with a physical object such that the virtual object may be perceived by the user as appearing to be aligned with the physical object. In another example, graphics (e.g., graphical elements containing information, instructions, and guides) appear to be attached to or overlaying a physical object of interest. To achieve this, the AR wearable device detects the physical object and tracks the position and orientation (the "pose") of the AR wearable device relative to a position of the physical object.

In a PM system and AR wearable device integration, the PM system and the AR wearable device are in communication with each other. Each, individually, or through each other, the PM system and the AR wearable device may also be in communication with other devices (such as mobile phones) or with networks containing other devices (such as servers). The PM system may provide the AR wearable device with telemetry information such as speed, acceleration, position of the controls, user position and pose, and battery level. The PM system may also provide information from a camera and other sensors. The AR wearable device, in turn, may provide performance related commands (e.g., limiting or modulating top speed, acceleration, braking power) or non-performance related commands (e.g., turning lights on and off, honking). The AR wearable device may also provide the PM system with telemetry gathered solely by the AR wearable device (e.g., speed calculated by the GPS, position and pose of the user). Similarly, the commands provided by the AR wearable device may be informed by the telemetry and sensor data received from the PM system. Still further, commands provided by the AR wearable device may only informed by information gathered by the AR wearable device.

User interaction with the AR wearable device may in some cases be provided by voice commands, by input to an associated device such as a smartphone, by gestures detected by the AR wearable device's cameras, or by a touchpad provided on the AR wearable device, which may be used to provide x-y touch and tap input to the AR wearable device.

In some examples, an augmented reality effect includes augmented reality content configured to modify or transform image data presented within a graphic user interface ("GUI") of the AR wearable device in some way. For example, complex additions or transformations to the appearance of the environment in the AR wearable device's field of view may be performed using AR effect data, such as highlighting, animating, or transforming traffic control signals, roads, buildings, and vehicles; adding enhancements to landmarks in a scene being viewed on an AR wearable device; or many numerous other such transformations. This includes both real-time modifications that modify an image as it is captured using a camera associated with the AR wearable device or some other device (e.g., a PM system) in communication with the AR wearable device, which is then displayed by the AR wearable device with the AR effect modifications, as well as modifications to stored content, such as video clips in a gallery that may be modified using AR effects. Similarly, real-time video capture may be used with an AR effect to show to a user of an AR wearable device how video images currently being captured by sensors of a device would modify the captured data. Such data may simply be displayed on the screen and not stored in memory, the content captured by the device sensors may be recorded and stored in memory with or without the AR effect modifications (or both), or the content captured by the device sensors may be transmitted, with the AR effect modification, over the network to a server or another device.

AR effects and associated systems and modules for modifying content using AR effects may thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples involve generating a 3D mesh model of the object or objects and using transformations and animated textures of the model within the video to achieve the transformation. In other examples, tracking of points on an object is used to place an image or texture, which may be two dimensional or three dimensional, at the tracked position. In still further examples, neural network analysis of video frames is used to place images, models, or textures in content (e.g., images or frames of video). AR effect data thus may include both the images, models, and textures used to create transformations in content, as well as additional modeling and analysis information needed to achieve such transformations with object detection, tracking, and placement.

FIG. 1 is perspective view of an AR wearable device (e.g., glasses 100), in accordance with some examples. The glasses 100 can include a frame 108 made from any suitable material such as plastic or metal, including any suitable shape memory alloy. In one or more examples, the frame 108 includes a front piece 102 including a first or left optical element holder 114 (e.g., a display or lens holder) and a second or right optical element holder 120 connected by a bridge 110. The front piece 102 additionally includes a left end portion 112 and a right end portion 118. A first or left optical element 116 and a second or right optical element 122 can be provided within respective left optical element holder 114 and right optical element holder 120. Each of the left optical element 116 and the right optical element 122 can be a lens, a display, a display assembly, or a combination of the foregoing. Any of the display assemblies disclosed herein can be provided in the glasses 100.

The frame 108 additionally includes a left temple piece 104 (i.e., a left arm) and a right temple piece 106 (i.e., a right arm) coupled to the respective left end portion 112 and right end portion 118 of the front piece 102 by any suitable means such as a hinge (not shown), so as to be coupled to the front piece 102, or rigidly or fixedly secured to the front piece 102 so as to be integral with the front piece 102. In one or more implementations, each of the left temple piece 104 and the right temple piece 106 includes a first arm portion 124 that is coupled to the respective left end portion 112 and right end portion 118 of the front piece 102 and any suitable second arm portion 126 for coupling to the ear of the user. In some examples, the front piece 102 can be formed from a single piece of material, so as to have a unitary or integral construction. In some examples, such as illustrated in FIG. 1, the entire frame 108 can be formed from a single piece of material so as to have a unitary or integral construction.

The glasses 100 can include a computing device, such as a computer 128, which can be of any suitable type so as to be carried by the frame 108 and, in one or more examples, of a suitable size and shape, so as to be at least partially disposed in one of the left temple piece 104 and the right temple piece 106. In one or more examples, as illustrated in FIG. 1, the computer 128 is sized and shaped similar to the size and shape of the right temple piece 106 (or the left temple piece 104) and is thus disposed almost entirely if not entirely within the structure and confines of such right temple piece 106. In one or more examples, the computer 128 is disposed in both of the right temple piece 106 and the left temple piece 104. The computer 128 can include one or more processors with memory, wireless communication circuitry, sensors and associated circuitry, and a power source. As discussed below, the computer 128 comprises low-power circuitry, high-speed circuitry, and a display processor. Various other examples may include these elements in different configurations or integrated together in different ways. Additional details of aspects of computer 128 may be implemented as illustrated by the glasses 100 discussed below.

The computer 128 additionally includes a battery 130 or other suitable portable power supply. In some examples, the battery 130 is disposed in one of the left temple pieces 104 and the right temple piece 106 or multiple batteries 130 located in each temple piece. In the glasses 100 shown in FIG. 1, the battery 130 is shown as being disposed in left temple piece 104 and electrically coupled to the computer 128 through electrical conductors disposed within the front piece 102. The glasses 100 can include a connector or port (not shown) suitable for charging the battery 130 accessible from the outside of frame 108. The glasses 100 can further include a wireless receiver, transmitter, or transceiver (not shown) or a combination of such devices, inertial measurement sensors, and other sensors disposed within the front piece 102, the left temple piece 104, and right temple piece 106.

In one or more implementations, the glasses 100 include one or more cameras 132. Although two cameras are depicted, other examples contemplate the use of a single or additional (i.e., more than two) cameras 132. In one or more examples, the glasses 100 include any number of sensors or peripheral devices in addition to the camera 132. For example, the glasses 100 may include sonar sensors, radar sensors, laser sensors, lidar sensors, and inertial measurement units (such as accelerometers, gyroscopes, and magnetometers).

The front piece 102 is provided with an outward facing, forward-facing front or outer surface 134 that faces forward or away from the user when the glasses 100 are mounted on the face of the user, and an opposite inward-facing, rearward-facing or rear or inner surface 136 that faces the face of the user when the glasses 100 are mounted on the face of the user. Such sensors can include inwardly facing video sensors or digital imaging modules such as a that can be mounted on or provided within the inner surface 136 of the front piece 102 or elsewhere on the frame 108 so as to be facing the user, and outward-facing video sensors or digital imaging modules such as the camera 132 that can be mounted on or provided with the outer surface 134 of the front piece 102 or elsewhere on the frame 108 so as to be facing away from the user. Such sensors, peripheral devices or peripherals can additionally include biometric sensors, location sensors (e.g., GPS), or any other such sensors.

In one or more implementations, the glasses 100 include input sensors such as touchpads or buttons (not shown). The touchpads may be mounted to or integrated with one or both of the left temple piece 104 and right temple piece 106. The touchpads are generally vertically arranged, approximately parallel to a user's temple in some examples. As used herein, generally vertically aligned means that the touchpad is at least more vertical than horizontal, although preferably more vertical than that. Additional user input may be provided by one or more buttons. The one or more touchpads and buttons provide a mechanism whereby the glasses 100 can receive input from a user of the glasses 100. The glasses 100 may include microphones to receive verbal commands from the user and monitor other sounds. Similarly, the glasses 100 may include speakers to provide auditory feedback to the user or allow the user to play music.

Figure 2:
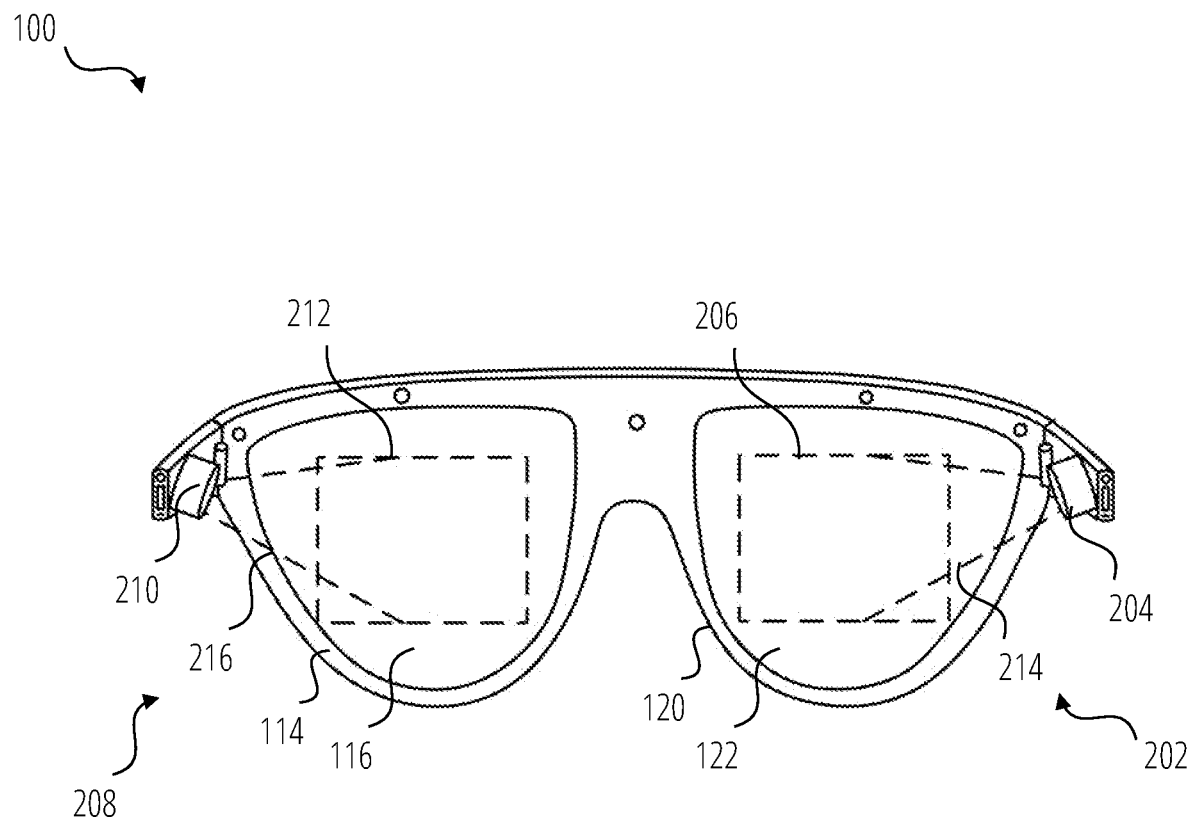
FIG. 2 illustrates a further view of the augmented reality wearable device of FIG. 1 from the perspective of the user, in accordance with some examples.

FIG. 2 illustrates the glasses 100 from the perspective of a wearer. For clarity, a number of elements shown in FIG. 1 have been omitted. As described in FIG. 1, the glasses 100 shown in FIG. 2 include left optical element 116 and right optical element 122 secured within each of the left optical element holder 114 and the right optical element holder 120, respectively.

The glasses 100 include a right forward optical assembly 202 comprising a right projector 204 and a right near eye display 206, and a left forward optical assembly 208 comprising a left projector 210 and a left near eye display 212.

In some examples, the near eye displays are waveguides. The waveguides include reflective or diffractive structures (e.g., gratings and/or optical elements such as mirrors, lenses, or prisms). Right projected light 214 emitted by the right projector 204 encounters the diffractive structures of the waveguide of the right near eye display 206, which directs the light towards the right eye of a user to provide an image on or in the right optical element 122 that overlays the view of the real world seen by the user. Similarly, left projected light 216 emitted by the left projector 210 encounters the diffractive structures of the waveguide of the left near eye display 212, which directs the light towards the left eye of a user to provide an image on or in the left optical element 116 that overlays the view of the real world seen by the user.

Other display technologies or configurations may be provided that can display an image to a user in a forward field of view. For example, instead of a right projector 204 or a left projector 210 and a waveguide, an LCD, LED or other display panel or surface may be provided instead.

In use, a wearer of the glasses 100 will be presented with information, content, AR effects, virtual objects and various user interfaces on the near eye displays. As described in more detail below, the user can then interact with the glasses 100 using a touchpad and/or the buttons (not shown), by gestures within the field of view of the cameras, as well as by providing voice inputs or touch inputs on an associated device, for example user device 404 illustrated in FIG. 11.

Figure 3:
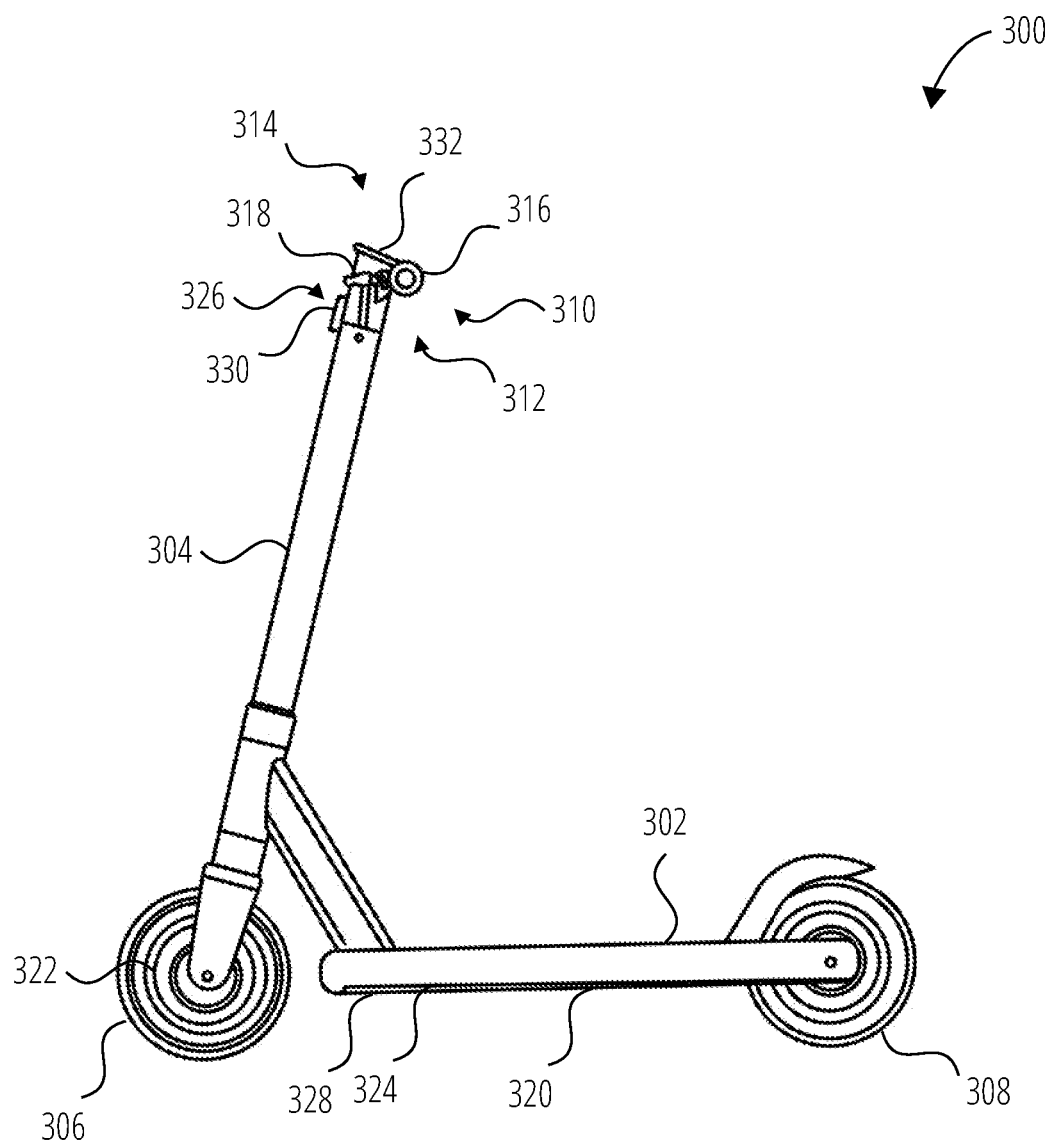
FIG. 3 is a side view of a personal mobility system, in accordance with some examples.

FIG. 3 is a side view of a PM system (e.g., a scooter 300), in accordance with some examples. The scooter 300 comprises a main body 302 with at least two wheels (i.e., front wheel 306 and rear wheel 308) mounted to the main body 302. The main body 302 provides a platform for at least a single user to stand on (or sit on with a seat secured to the main body 302). The scooter 300 further includes a steering column 304 coupled to at least one of the wheels (i.e., front wheel 306). In some examples, each of the front wheel 306 and rear wheel 308 comprises a wheel hub, spokes, a wheel rim and tire. The steering column 304 is rotatably coupled to the main body 302 to permit steering of the front wheel 306.

The steering column 304 further comprising handlebars 310 extending at a substantially perpendicular orientation from the steering column 304 with the handlebars 310 set at a height for a user to steer the scooter 300 while riding. The handlebars 310 may include a left handle 312 and a right handle 314. The left handle 312 includes an acceleration control 316 and a brake control 318 operably connected to the brake of at least one of the front wheel 306 and the rear wheel 308. As will be discussed in further detail below, each of the acceleration control 316 and brake control 318 is operably connected to a management system 324.

The scooter 300 also includes a power source 320, a propulsion source 322, a management system 324, and forward-looking sensors 326.

The power source 320 and the propulsion source 322 are each independently operably connected to the management system 324. The acceleration control 316 and the brake control 318 are also each independently operably connected to the management system 324, although in some cases the brake control 318 may only be physically coupled to a manual brake system. In operation the user provides inputs through the acceleration control 316 and the brake control 318 to the management system 324 for starting, maintaining, changing and ceasing movement of the scooter 300. Additionally, regenerative braking may be provided via the acceleration control 316. As will be further discussed below, the user may also provide inputs through at least one of the glasses 100 and a user device 404. The management system 324 directs the flow of energy from the power source 320 to the propulsion source 322.

The propulsion source 322 further comprises a motor, a power linkage to the management system 324, and mechanical linkage to at least one of the front wheel 306 and the rear wheel 308 so that the propulsion source 322 can drive at least one of the wheels. For the sake of clarity, the motor may directly drive the wheels or indirectly drive the wheels via a chain/sprocket/drive shaft/transmission/or other indirect drive means. In some implementations, the brake and propulsion source may be disposed within the hub of at least one of the front wheel 306 and the rear wheel 308. In the implementation illustrated in FIG. 3, the propulsion source 322 is located in the front wheel 306. The brake can include front and rear drum or disk brakes operably connected to the brake control 318. Other types of brakes such as cantilever, and V-brakes may also be used.

The power source 320 may be disposed within the main body 302 and may be charged by the management system 324, which in turn receives power from an outside power source through a connector 328. In some implementations, the power source 320 is removable, allowing a user to swap power sources 320 and to charge each power source 320 away from the scooter 300.

Additionally, the management system 324 is operatively connected to the forward-looking sensors 326 and the visual feedback element 332. The forward-looking sensors 326 are disposed within the sensor housing 330 and mounted to the steering column 304 so that the forward-looking sensors 326 have an unobstructed view in the direction of travel of the scooter 300. The forward-looking sensors 326 may include sensing technologies such as cameras, sonar sensors, radar sensors, laser sensors, and lidar sensors; as well as safety components such as lights or horns. The visual feedback element 332 faces the user and provides the user with information (e.g., power source status, speed, location, and other data received from the management system 324). The visual feedback element 332 may also include a communications module (such as Bluetooth transducer, antennas) operably connected to the management system 324. Additional elements of the scooter 300 will be discussed in further detail below with respect to the networked devices 1102. In some implementations, elements of the management system 324 are integrated into the networked device 1102.

Figure 4:
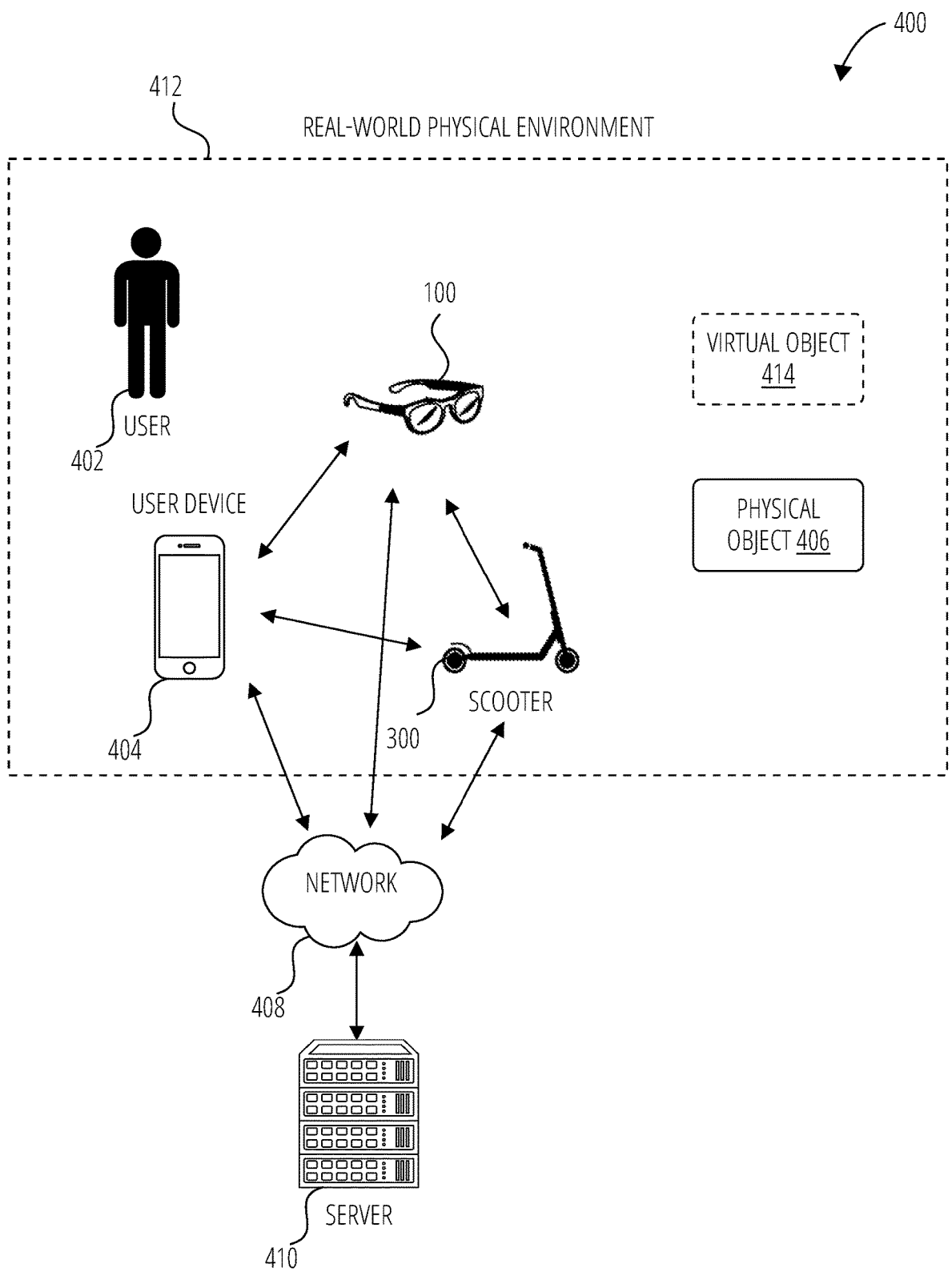
FIG. 4 illustrates a network environment suitable for operating an AR wearable device and a personal mobility system according to some examples.

FIG. 4 is a network diagram illustrating a network environment 400 suitable for operating an AR wearable device (such as glasses 100) and a PM system (such as a scooter 300), according to some examples. The network environment 400 includes glasses 100, a scooter 300, a user device 404, and a server 410, communicatively coupled to each other directly or via a network 408. The glasses 100, scooter 300, user device 404, and the server 410 may each be implemented in a computer system, in whole or in part, as described below with respect to FIG. 13. The server 410 may be part of a network-based system. For example, the network-based system may be or include a cloud-based server system that provides additional information, such as geographical location information or virtual content (e.g., three-dimensional models of virtual objects) to the glasses 100, the scooter 300, and the user device 404.

The user device 404 may be a smartphone, tablet, phablet, laptop computer, access point, or any other such device capable of connecting with the glasses 100 and the scooter 300 using both a low-power wireless connection and a high-speed wireless connection. The user device 404 is connected to the server 410 and the network 408. The network 408 may include any combination of wired and wireless connections. The server 410 may be one or more computing devices as part of a service or network computing system. The user device 404 and any elements of the server 410 and network 408 may be implemented using details of the software architecture 1202 or the machine 1300 described in FIG. 12 and FIG. 13.

A user 402 operates the glasses 100 and the scooter 300. The user 402 may be a human user (e.g., a human being), a machine user (e.g., a computer configured by a software program to interact with the glasses 100 and the scooter 300), or any suitable combination thereof (e.g., a human assisted by a machine or a machine supervised by a human). The user 402 is not part of the network environment 400 but is associated with the glasses 100, scooter 300, and the user device 404.

Although the AR wearable device in FIG. 4 is represented as glasses 100, the AR wearable device may be a computing device with a display such as a smartphone, a tablet computer, or other wearable computing device. The computing device may be hand-held or may be removably mounted to a head of the user 402. In some examples, the display is a screen that displays what is captured with a camera of the computing device. In another example, the display of the device may be transparent, such as one or both of the left optical element 116 and the right optical element 122 of glasses 100.

The user 402 interacts with an application running on the glasses 100 or the user device 404 or a combination thereof. The application may include an AR application configured to provide the user 402 with an experience associated with a physical object 406, such as a two-dimensional physical object (e.g., a picture), a three-dimensional physical object (e.g., a statue, a car, a person), a specific location (e.g., a landmark), or any references (e.g., perceived corners of walls or furniture) in the real-world physical environment 412.

The AR application can also provide the user 402 with an experience associated with operation of the scooter 300 in addition to presenting information provided by the scooter 300. For example, the user 402 may point a camera 132 of the glasses 100, which captures an image or video feed of a physical object 406 (e.g., a stop sign, a traffic light, a pothole). The contents of the image or video feed are tracked and recognized in the glasses 100 using a local context recognition dataset module of the AR application of the glasses 100. The local context recognition dataset module may include a library of virtual objects or machine-learning models associated with real-world physical objects or references. The AR application then generates additional information related to the image or video feed (e.g., a three-dimensional model, a visual effect, an overlay of textual or symbolic information) and presents this additional information in a display of the glasses 100 in response to identifying features in the image or video feed. If the contents of the video feed or image are not recognized locally at the glasses 100, the glasses 100 may download additional information (e.g., the three-dimensional or machine learning model), from a database of the server 410 over the network 408 or may provide the image or video feed to an associated device (e.g., the user device 404 or server system 1108) for processing.

In some examples, the server 410 is used to detect and identify the physical object 406 based on sensor data (e.g., image and depth data, location) from the glasses 100 or the scooter 300 and to determine a position or pose of at least one of the glasses 100, the scooter 300, and the physical object 406 based on the sensor data. The server 410 can also retrieve or generate a virtual object 414 based on the pose and position of the glasses 100, the scooter 300, the physical object 406, and, in some implementations, of the user device 404. The server 410 or the user device 404 communicates the virtual objects 414 to the glasses 100, which can then display the virtual objects 414 to the user 402 at an appropriate time. Alternatively, the data comprising the virtual objects could be stored in local memory in the user device 404, glasses 100 The object recognition, tracking, virtual object generation and AR rendering can be performed on either the glasses 100, the scooter 300, the user device 404, the server 410, or a combination thereof.

The scooter 300 and the glasses 100 interact with each other to provide a safer environment to the user 402. In some examples, the scooter 300 monitors hazardous conditions and the AR glasses respond to notifications of a hazardous condition transmitted from the scooter 300. This may be advantageous because the scooter is likely to have a larger battery or other power source with more capacity than the battery 130 in the glasses 100, and may also have a more powerful processor. Additionally, since the scooter 300 is interacting directly with the user 402, the scooter 300 may be in a better position to detect and report a hazardous condition or increased level of risk. However For example, if the scooter 300 detects the sharp application of the brake control 318, or sharp deceleration using its IMU, or a quick turn on the handlebars 310, or a quick change in direction using its IMU, the scooter can transmit a signal to the glasses 100 or the user device 404 indicating an increased risk level. Furthermore, the scooter 300 (or other vehicle) may be performing its own independent safety monitoring tasks, which can serve as the basis for the determination of an increased risk level.

Any of the machines, databases, or devices shown in FIG. 4 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 12 and FIG. 13. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 4 may be combined into a single machine, and the functions described herein for any single machine, database, or device may be subdivided among multiple machines, databases, or devices.

The network 408 may be any network that enables communication between or among machines (e.g., server 410), databases, and devices (e.g., glasses 100). Accordingly, the network 408 may be a wired network, a wireless network (e.g., a mobile or cellular network), or any suitable combination thereof. The network 408 may include one or more portions that constitute a private network, a public network (e.g., the Internet), or any suitable combination thereof.

Figure 5A:
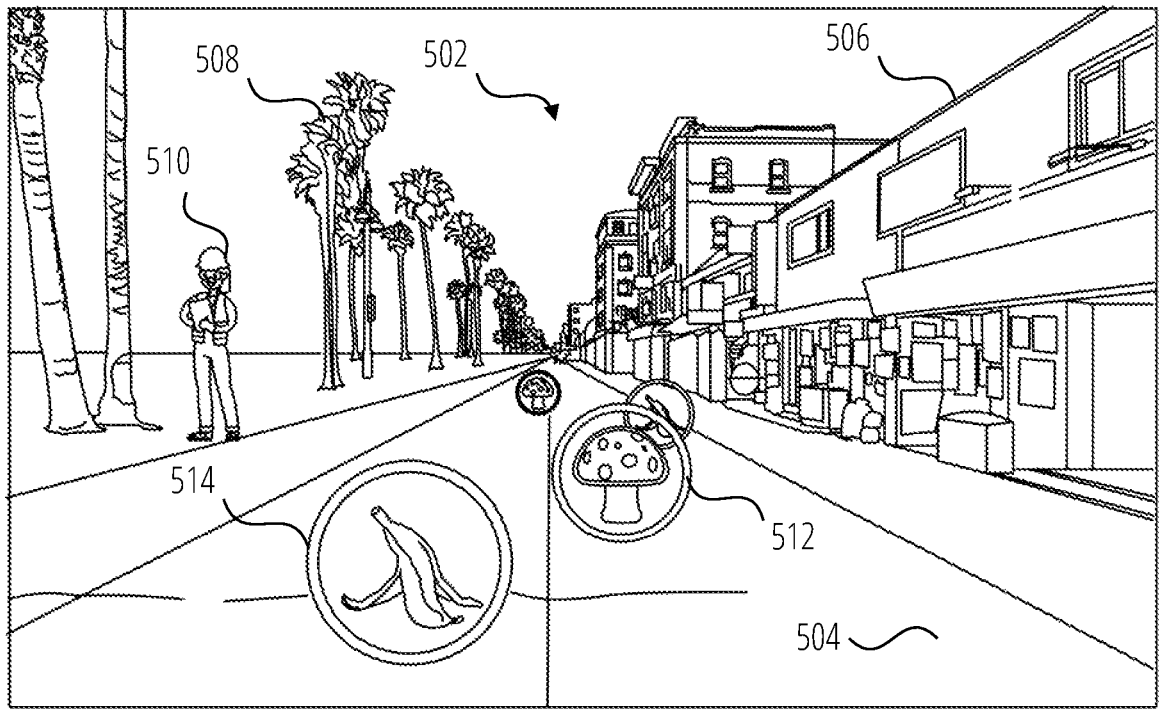
FIG. 5A is a view of an outdoor environment that has been enhanced with AR elements that are displayed on the displays of the glasses of FIG. 1 according to some examples.

FIG. 5A is a view of an outdoor environment 502 that has been enhanced with AR content elements that are displayed on the displays 1116 of the glasses 100 according to some examples. In this example, a user is riding a scooter 300 along a street or pathway 504 in the environment 502, which includes buildings 506, trees 508, people 510 and so forth. The pose of the glasses 100 relative to the environment 502 has been determined and is continually updated using known AR localization and tracking techniques.

The pose of the glasses 100 permits virtual objects to be displayed to the user in the frame of reference of the environment. That is, a virtual object such as a power up 512 (illustrated as a mushroom) and a power down 514 (illustrated as a banana) can be displayed by the glasses 100 in a fixed position on the pathway 504. As the user turns their head or approaches one of the virtual objects, its apparent position on the pathway 504 is maintained, with appropriate scaling as the user approaches or recedes from the virtual object.

In the illustrated example, the user 402 is playing a game or participating in a race in which the virtual objects can affect the scoring of the game or the outcome of the race. For example, when the scooter 300 passes over (the location of) a power up 512, the available power or the top speed of the scooter 300 can temporarily be increased, or the maximum speed of the scooter can be increased. Similarly, when the scooter 300 passes over a power down 514, the available power or the top speed of the scooter 300 can be decreased. Alternatively, points can be awarded or subtracted based on interaction with virtual objects.

It will be appreciated that the presence of the power ups 512 and power downs 514 in the field of view of the user 402 may reduce the amount of attention that a user is paying to the surrounding environment 502 and its contents. In the event that an increased level of risk or an unsafe condition is detected, the user's field of view can be partially or completely cleared of virtual objects. This can be done, for example, by reducing the number of virtual objects displayed by the glasses 100, by changing their size, color, transparency or other visual characteristics, or moving them out of the user's central field of view. In some examples, virtual objects 414 may be simplified, and only the more important or relevant virtual objects may be maintained. The importance of a particular virtual object will depend on the particular circumstances and will typically relate to the nature of the interaction between the user and the glasses 100. For example, if the glasses are being used for navigation, more important information may be a directional arrow signaling the next turn, while less important information may be icons identifying restaurants within the field of view.

Additionally, in addition to clear the user's central field of view, the virtual objects may be moved up or down in the display to free up the user's peripheral vision of virtual objects, or to keep it free of virtual objects. The user's peripheral vision tends to be more useful in an emergency situation than the upper or lower portions of the field of view.

Figure 5B:
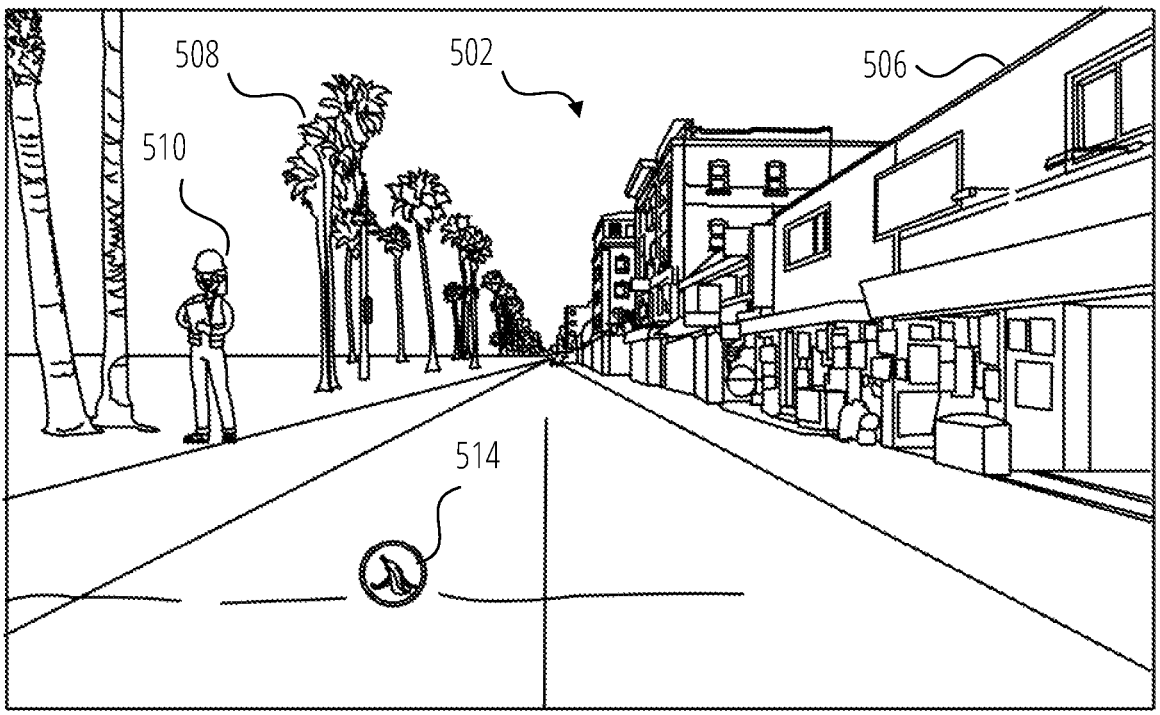
FIG. 5B is the view of the outdoor environment of FIG. 5A after an increased risk level or unsafe condition has been detected or signaled, according to some examples.

FIG. 5B is the view of the outdoor environment 502 of FIG. 5A after an increased risk level or unsafe condition has been detected or signaled, according to some examples. As can be seen, a reduced degree of content is displayed compared to FIG. 5A in that most of the power ups 512 and power downs 514 have been removed from being displayed to the user 402 by the glasses 100. In this particular case, only the closest (and thus most relevant) virtual object, the power down 514 has been maintained, but it has been reduced in size compared to the original power down 514. In this case, the position of the power down 514 has been maintained, because its attributes and relevance are tied to its perceived location in the environment 502.

Figure 6A:
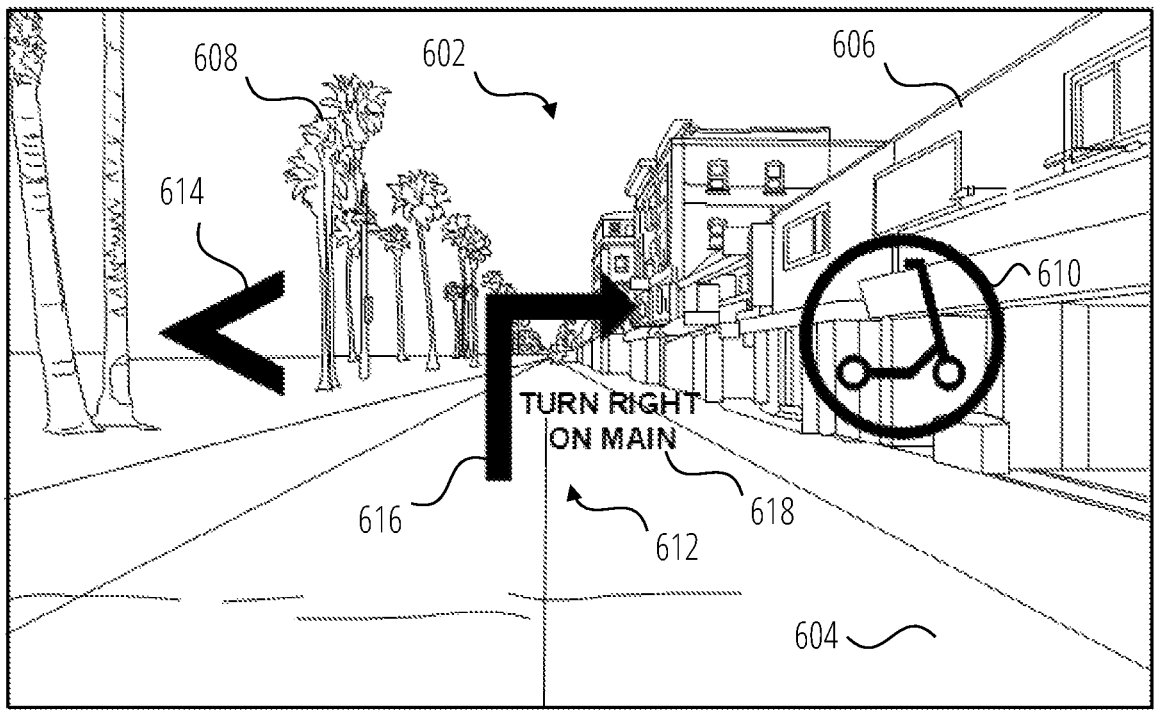
FIG. 6A is a view of an outdoor environment that has been enhanced with AR elements that are displayed on the displays of the glasses of FIG. 1 according to some examples.

FIG. 6A is a view of an outdoor environment 602 that has been enhanced with AR content elements that are displayed on the displays 1116 of the glasses 100 according to some examples. In this example, a user is either riding a scooter 300 or walking along a pathway 604 in the environment 602, which includes buildings 606, trees 608, scooter icon 610 and so forth. The pose of the glasses 100 relative to the environment 602 has been determined and is continually updated using known AR localization and tracking techniques, as described above. The pose of the glasses 100 permits virtual objects to be displayed to the user in the frame of reference of the environment.

In this particular case, displayed on the displays are AR elements that have and continue to be positioned to assist the user of the glasses 100 to locate and find an available PM system, such as a scooter 300. For purposes of conciseness, FIG. 6A shows all three of a scooter icon 610, a navigation prompt 612 and an out-of-view prompt 614, but one or multiple of these may be shown depending on the particular circumstances at the time.

In the situation illustrated in FIG. 6A, the user 402, who may be on foot, on a scooter 300, in or on another vehicle, and so forth, has provided user input to locate a PM system in the vicinity. For example, the glasses 100 or the user device 404 may have received voice input or other input in a user interface of the glasses 100 or provided on the user device 404. In response, the locations of nearby PM systems are determined by the glasses 100 or the user device 404.

If the locations of any PM systems have been received or determined, relevant information is displayed to the user via the glasses 100. For example, if a PM system is located in a direction that is within the field of view of the glasses 100, a virtual reality effect or object or graphical representation such as a scooter icon 610 is displayed by the glasses 100 in a direction in the field of view that corresponds to the direction in which the PM system is located. The user 402 can thus find the PM system by walking or riding in the direction of the scooter icon 610, which will of course involve walking around any intervening buildings while monitoring the updated position of the scooter icon 610. If an available scooter is not in a direction that is within the field of view of the glasses 100, a directional out-of-view prompt 614 may be provided, indicating a direction in which the user 402 should turn their head to bring the direction of the scooter into the user's field of view.

Receipt of selection of the scooter icon 610 by the user 402 may result in the display of additional information about, or user interface options relating to, the scooter 300. For example, in response to the user selecting an option to navigate to a PM system, such as by a user selecting a scooter icon 610 and then selecting an associated navigation option, navigation prompts 612 are displayed to the user by the glasses 100. In some examples, navigation prompts 612 include directional prompts 616 and text 618, as well as corresponding audible prompts. As the user follows the prompts, the navigation prompts 612 will be updated as is known in the navigation field.

As can be seen from FIG. 6A, the out-of-view prompt 614, the navigation prompt 612 and the scooter icon 610 are prominently positioned and displayed in the field of view of the glasses 100 (and thus of the user 402).

Figure 6B:
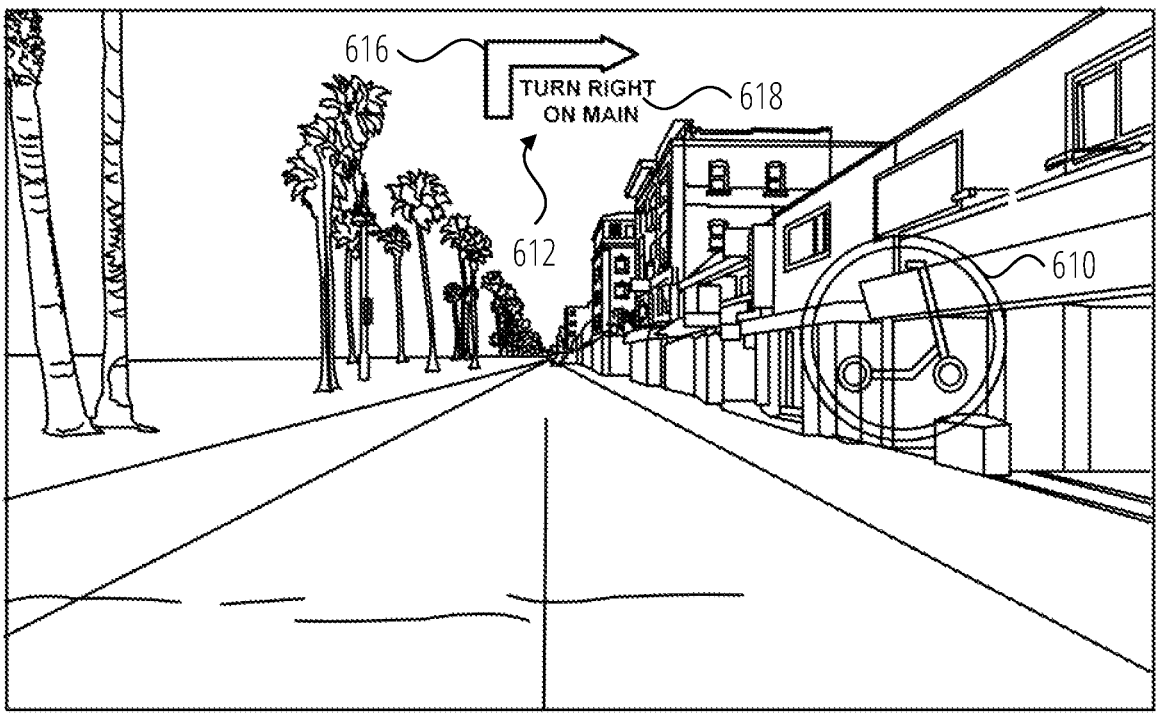
FIG. 6B is the view of the outdoor environment of FIG. 6A after an increased risk level or unsafe condition has been detected or signaled, according to some examples.

FIG. 6B is the view of the outdoor environment 602 of FIG. 6A after an increased risk level or unsafe condition has been detected or signaled, according to some examples. As can be seen, a reduced degree of content is displayed compared to FIG. 6A, in that a less important virtual object, the out-of-view prompt 614, has been removed completely to provide an increased visual field. The scooter icon 610 on the other hand, has had its visual properties altered so as to provide less visual obstruction. In particular, the solid fill of the lines in the scooter icon 610 has been removed and replaced with no fill or a transparent fill, enabling better perception of objects in the real world behind the scooter icon 610.

A similar effect has been applied to the directional prompt 616. Both the directional prompt 616 and the text 618 have also been reduced in size. Notably, the navigation prompt 612 itself has been moved upward in the field of view, to provide a more unobstructed view in the user's central field of view, and has been reduced in size in a vertical direction.

FIG. 7A illustrates a user interface screen 702 displayed by the glasses 100 of FIG. 1 in accordance with some examples. As can be seen from the figure, the user interface screen 702 includes a carousel 704 of icons 706 that occupying positions from left to right on the user interface screen 702. Also disclosed is a null icon 712 occupying a central position 708 in the carousel 704. The circle illustrating the central position 708 is larger, to indicate that an icon in that position is available for selection in this example, but could also indicate that the icon in that position has been selected or is active. The null icon 712 which in the example is a plain color such as white or black, indicates that no icon or action is available for selection or selected when in the central position 708 in carousel 704.

The icons 706 can be scrolled left or right to permit placement of a particular icon 706 in the central position 708 for selection. Scrolling may for example be accomplished by a swipe input on a touchpad. When an icon 706 occupies the central position 708, it can be selected or activated, for example by tapping on the touchpad. In the illustrated example, the icons 706 represent AR effects that can be applied to the displays of the glasses 100 but it will be appreciated that other actions can be defined by the icons and that other user interfaces may be provided.

FIG. 7B illustrates a user interface screen 710 displayed by the glasses 100 after an increased risk level or unsafe condition has been detected or signaled, according to some examples. More particularly, user interface screen 710 shows how user interface screen 702 may be modified in response to an increased risk level or unsafe condition.

As can be seen, a reduced degree of content is displayed compared to FIG. 7B in that the carousel 704 has been moved upward in the field of view, to provide a more unobstructed view in the user's central field of view, and has been compressed in a vertical direction. In this view, the user interface screen 710 and carousel 704 still retain the user interface options and characteristics of user interface screen 702, but in a more compact and out-of-the-way arrangement.

of the glasses 100 FIG. 8A illustrates a user interface screen 802 displayed by the glasses 100 in accordance with some examples. User interface screen 802 provides a means whereby one or more intended recipients of a media item that is to be forwarded can be selected. In particular, a carousel 804 of potential recipients is shown, for example recipient 806 and recipient 808. In this context, a recipient may be an individual recipient, a group of recipients (for example "Brunch Club" recipient 808, "Besties"), or a nonhuman recipient (for example "My Story" recipient 806). Selection of non-human recipients may for example result in a media item being added to a social media or messaging application feed, or a map indicating the location of the scene and identifying user information, provided appropriate permissions allowing same have been obtained. Recipients in user interface screen 802 are identified by a recipient name and one or more recipient avatars.

As before, recipients can be moved left or right in the carousel 804, with recipients sequentially replacing a recipient in a central position as the carousel 804 scrolls left or right. Scrolling may for example be accomplished by a swipe input on a touchpad. A recipient occupying the central position in the carousel 804 can be selected by tapping on the touchpad or by a button press. A recipient occupying a central position may be highlighted, for example by being enclosed in a frame 816 or by using another highlighting technique such as increased size or by adjusting the colors relative to adjacent recipients.

A recipient that has been selected is indicated with a check mark 810. Also provided is a confirm prompt 812 and a return prompt 814. An up swipe as indicated by the confirm prompt 812 will confirm the selection(s) while a down swipe as indicated by the return prompt 814 will return to a previous user interface screen.

FIG. 8B illustrates a user interface screen 818 displayed by the glasses 100 after an increased risk level or unsafe condition has been detected or signaled, according to some examples. More particularly, user interface screen 818 shows how user interface screen 802 may be modified in response to an increased risk level or unsafe condition.

As can be seen, a reduced degree of content is displayed compared to FIG. 8A in that the carousel 804 has been moved upward in the display, and has been simplified by the removal of the avatars in recipient identifiers, such as for recipient 806 and recipient 808. This has permitted the carousel 804 to be displayed in a more compact format. However, the information that is more relevant or critical for selecting recipients for the forwarding of an item, has been retained, including the text identifying the recipients, the check marks 810 for selected recipients, the confirm prompt 812 and the return prompt 814, although the latter has also been simplified by the removal of its identifying text. The confirm prompt 812 has also been moved downward out of the user's central field of view.

FIG. 9A illustrates a user interface screen 902 displayed by the glasses 100 of FIG. 1 in accordance with some examples. As can be seen from the figure, the user interface screen 902 includes various information regarding the glasses 100 or the user device 404, such as battery level, speaker volume, Wi-Fi network identification and signal strength, display brightness, the user's devices' names, the user's avatar, time of day, date, firmware version, and so forth.

FIG. 9B illustrates a user interface screen 904 displayed by the glasses 100 after an increased risk level or unsafe condition has been detected or signaled, according to some examples. More particularly, user interface screen 904 shows how user interface screen 902 may be modified in response to an increased risk level or unsafe condition.

As can be seen, a reduced degree of content is displayed compared to FIG. 9A in that less relevant or critical information has been removed (such as the user's devices' names, the user's avatar, and the firmware version) while more relevant or more critical information (such as battery level, speaker volume, Wi-Fi network identification and signal strength, time of day, date) are maintained but moved either upward or downward in the user interface screen 904 to provide a more unobstructed view in the user's central and peripheral fields of view.

Figure 10:
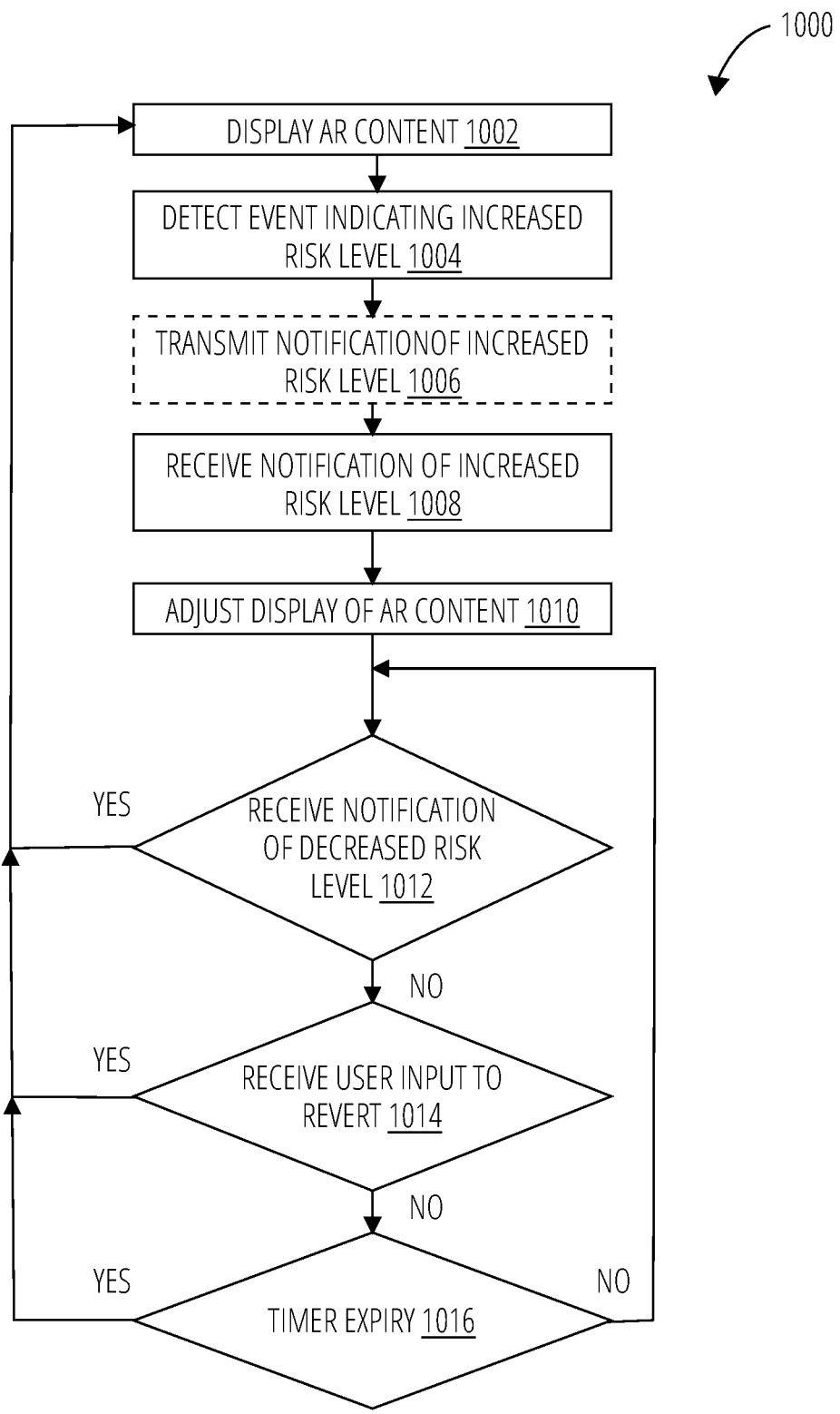
FIG. 10 is a flowchart showing adjustment of the display of content in the network environment of FIG. 4, according to some examples.

FIG. 10 is a flowchart 1000 showing adjustment of the display of content in a network environment 400, according to some examples.

The operations illustrated in FIG. 10 will typically execute on a combination of user device 404 and glasses 100, although the operations may execute exclusively in glasses 100 or in a combination of the glasses 100 and one or all of user device 404, scooter 300 and server 410. Various implementations are of course possible. In some examples, the operations are performed jointly between the glasses 100 and a user device 404. For example, that glasses 100 provide a video feed for processing from at least one of its cameras 132 and positional information from its IMU and GPS receiver to an AR application running on the user device 404. The client device 404 processes the video feed, performs any localization and tracking, and generates and transmits AR effects, including virtual objects 414, to the glasses 100 for display to the user 402.

The method starts at operation 1002 with the glasses displaying AR content to the user 402. The user may for example be riding the scooter 300 while receiving or viewing AR content or displays as discussed above with reference to FIGS. 5 to 9.

In operation 1004, an event or other circumstances indicating an increased risk level is detected by the scooter 300, user device 404 or the glasses 100. For example, the scooter 300 may detect a sharp application of its brakes, a sudden steering input, or other manipulation of a scooter control, a sharp movement of the scooter itself (such as hitting a bump or a sudden rotation about an axis) detected by the scooters IMU, an imminent collision, and so forth. The detection of the event may be performed by an existing safety system included in the scooter 300, for example an instruction to automatically apply the scooter's brakes, traction control or ABS intervention or a proximity warning. That is, the detected event may itself be the response to an actual event that is detected by an existing or independent system in the scooter. Additionally, sudden movements or the proximity or rapid closing of objects can be detected by the glasses 100.

In the case of detections of events or the triggering of events on or by the scooter 300, an appropriate notification is transmitted to the glasses 100 or the user device 404 in operation 1006. The notification may be a general notification of an increased risk level or may be a degree of increased risk level (low, moderate, severe) or may be an indication of a specific type of increased risk level such as a potential loss of control or an imminent collision.

The notification of the increased risk level is received by the glasses 100 or the user device 404 in operation 1008. In some cases, this receipt might be internal to the glasses 100, for example when the glasses 100 are also the device that detected the event indicating the increased risk level.

In response to receiving the notification of the increased risk level in operation 1010, the display of the AR elements on the glasses 100 is adjusted to provide less distraction or a clearer field of view as discussed in more detail above. In some cases, AR elements are moved out of a central field of view such as upwards or downwards, have their size or other visual characteristics adjusted, or less-important AR elements are eliminated from the display. Additionally, certain user-interface options may be removed or disabled or paused, such as content editing or the playing of a game.

As used herein, the term "degree of content" refers to the amount of visual obstruction or distraction provided by the display of the AR elements. The degree of content can vary with the amount of information being displayed, the size or number of the AR elements being displayed, the presence or absence of visual effects such as highlighting, flashing, changes of texture or color, the transparency of the AR element, the positioning of the AR element, with central position providing a higher level of distraction or obstruction. As will be readily apparent, in response to the notification of an increased risk level, the degree of content displayed to the user by the glasses 100 is reduced from a first (greater) degree to a second lesser degree.

In operation 1012 the glasses 100, scooter 300 or user device 404 determine whether the level of risk has decreased sufficiently or returned to its original level. In some cases, this may be as a result of receipt of a notification of the increased risk level ceasing (such as a collision warning signal or message no longer being received or generated) from the scooter 300 or client device 404, or an affirmative notification that the event that caused an increased risk level to be detected has gone or otherwise that safe conditions have resumed. If such a notification is detected or received, the method returns to 1002, in which the original AR content is displayed by the glasses 100 as before. The resumption of the previous display may be delayed by a short time and the transition of the display back to the former level of detail and the associated movement and resizing of any AR content may take place gradually so as not to startle or distract the user.

In operation 1014, if user input to revert to the former display is received by the glasses 100 or user device 404, then the method returns to 1002, in which the original AR content is displayed as before. User input may be provided for example by input received on a touchpad of the glasses 100, voice input, and so forth.

Finally, if a timer expires after a predetermined amount of time has passed, as in operation 1016, then the method returns to 1002, in which the original AR content is displayed as before. If none of the conditions specified in operation 1012, operation 1014 or operation 1016 are met, then the adjusted display of the AR content continues and the method returns to operation 1012.

In some cases, the degree of adjustment that takes place in operation 1010 may depend on the type of increased risk that is detected or the level of increased risk that is detected. For example, an imminent collision may result in a dramatic adjustment in the display of the AR content while a moderately sharp application of the scooter's brakes may result in a less dramatic adjustment in the display of the AR content.

Figure 11:
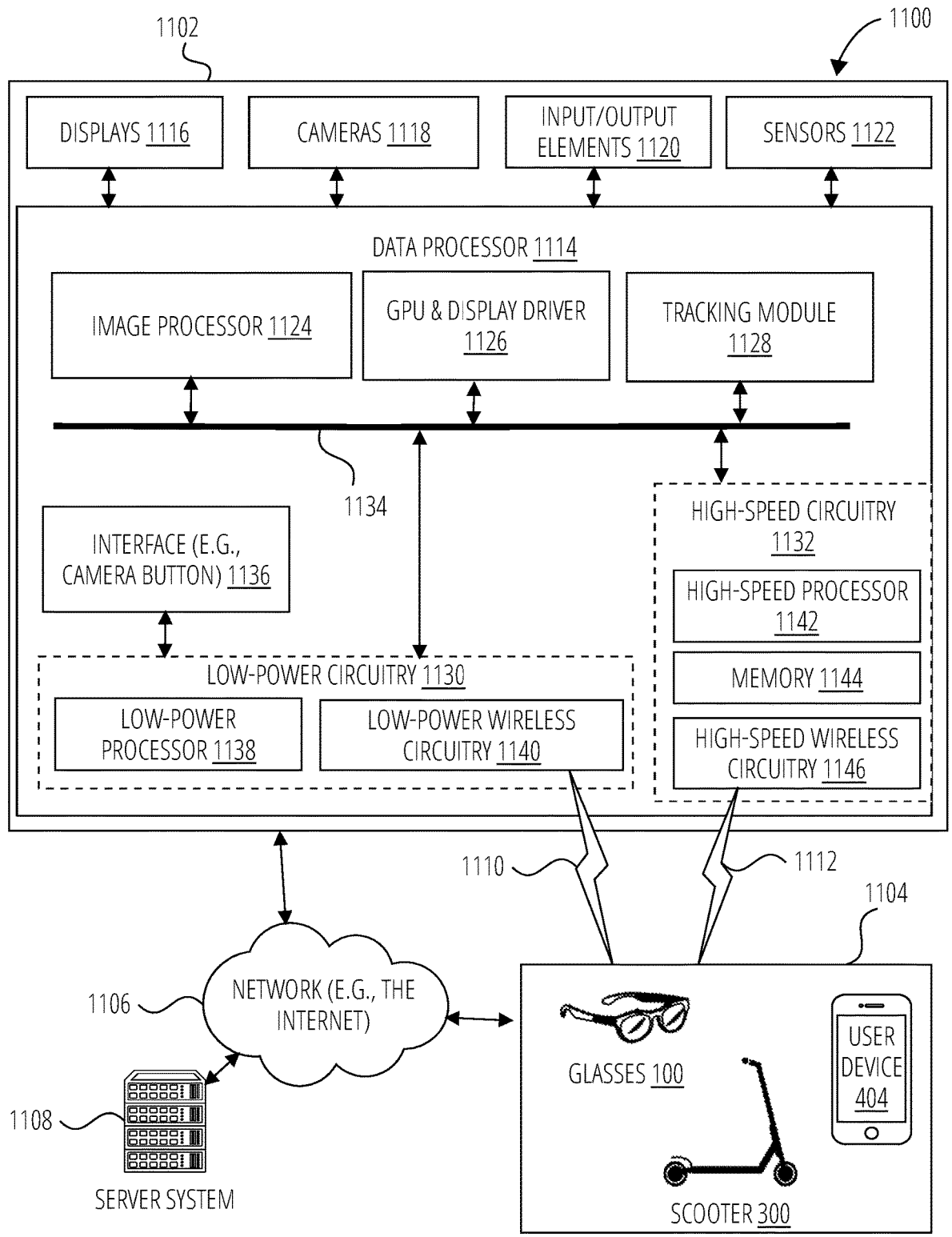
FIG. 11 is a block diagram illustrating a networked device 1102 including details of the glasses and scooter of FIG. 1 and FIG. 4, in accordance with some examples.

FIG. 11 is a block diagram 1100 illustrating a networked device 1102 including details of the glasses 100 and the scooter 300, in accordance with some examples.

The networked device 1102 (e.g., glasses 100, scooter 300, user device 404) is communicatively coupled to at least one second networked device 1104 and a server system 1108. The distinction between the networked device 1102 and the second networked device 1104 is made only for purpose of differentiating between two distinct devices. It should be understood that the description made herein with respect to the networked device 1102 describes in equal measure the second networked device 1104.

The networked device 1102 is capable of communicatively coupling with the second networked device 1104 using both a low-power wireless connection 1110 and a high-speed wireless connection 1112. The second networked device 1104 is connected to the server system 1108 via the network 1106. The network 1106 may include any combination of wired and wireless connections. The server system 1108 may be one or more computing devices as part of a service or network computing system. The second networked device 1104 and any elements of the server system 1108 and network 1106 may be implemented using details of the software architecture 1202 or the machine 1300 described in FIG. 12 and FIG. 13.

The networked device 1102 may include a data processor 1114, displays 1116, one or more cameras 1118, input/output elements 1120, and additional sensors 1122. The input/output elements 1120 may include microphones, audio speakers, biometric sensors, or additional display elements (e.g., Visual feedback element 332) integrated with the data processor 1114. In some implementations, input/output elements 1120 such as speakers, horns, haptic generators, displays and head lights/signal/telltale lights all are used to cue the user of a networked device 1102 of safety issues, warn the rider visually, aurally, or haptic notice of a safety issue. Examples of input/output elements 1120 are discussed further with respect to FIG. 12 and FIG. 13. For example, the input/output elements 1120 may include any of I/O components 1302 including output components 1304, motion components 1306, and so forth. Examples of the displays 1116 are discussed in FIG. 1 and FIG. 2. In the particular examples described herein, the displays 1116 include a display for each one of a user's left and right eyes.

Sensors 1122 may include optical sensors (e.g., photoresistors, lidar, infrared), radio frequency sensors (e.g., radar), mechanical wave sensors (e.g., sonar, pressure), and inertial sensors (e.g., accelerometers, gyroscopes, magnetometers). The networked device 1102 may use some or all of the foregoing to detect physical objects or determine a position or pose of the networked device 1102. For example, inertial sensors may provide information on the roll, yaw, and pitch of the networked device 1102. The networked device 1102 may use this information to detect and notify the user of accidents or other impacts, detect uphill travel to increase power to a propulsion source (e.g., propulsion source 322), or detect downhill travel to establish system braking or power recovery to keep the networked device 1102 (or the second networked device 1104) from exceeding safe speeds and accelerations. Integration with accelerometer/speedometer data also provides significant data for the networked device 1102 to detect, intervene if necessary, and transmit instructions to drive propulsion (e.g., by the management system 324 to the propulsion source 322) and braking performance.

The data processor 1114 includes an image processor 1124 (e.g., a video processor), a GPU & display driver 1126, a tracking module 1128, low-power circuitry 1130, and high-speed circuitry 1132. The components of the data processor 1114 are interconnected by a bus 1134.

The data processor 1114 also includes an interface 1136. The interface 1136 refers to any source of a user command that is provided to the data processor 1114. In one or more examples, the interface 1136 is a physical button that, when depressed, sends a user input signal from the interface 1136 to a low-power processor 1138. A depression of such button followed by an immediate release may be processed by the low-power processor 1138 as a request to capture a single image, or vice versa. A depression of such a button for a first period of time may be processed by the low-power processor 1138 as a request to capture video data while the button is depressed, and to cease video capture when the button is released, with the video captured while the button was depressed stored as a single video file. Alternatively, depression of a button for an extended period of time may capture a still image. In other examples, the interface 1136 may be any mechanical switch or physical interface capable of accepting user inputs associated with a request for data from the cameras 1118. In other examples, the interface 1136 may have a software component, or may be associated with a command received wirelessly from another source, such as from the user device 404.

The image processor 1124 includes circuitry to receive signals from the cameras 1118 and process those signals from the cameras 1118 into a format suitable for storage in the memory 1144 or for transmission to the user device 404. In one or more examples, the image processor 1124 (e.g., video processor) comprises a microprocessor integrated circuit (IC) customized for processing sensor data from the cameras 1118, along with volatile memory used by the microprocessor in operation.

The low-power circuitry 1130 includes the low-power processor 1138 and the low-power wireless circuitry 1140. These elements of the low-power circuitry 1130 may be implemented as separate elements or may be implemented on a single IC as part of a system on a single chip. The low-power processor 1138 includes logic for managing the other elements of the networked device 1102. As described above, for example, the low-power processor 1138 may accept user input signals from the interface 1136. The low-power processor 1138 may also be configured to receive input signals or instruction communications from the user device 404 via the low-power wireless connection 1110. The low-power wireless circuitry 1140 includes circuit elements for implementing a low-power wireless communication system. Bluetooth™ Smart, also known as Bluetooth™ low energy, is one standard implementation of a low power wireless communication system that may be used to implement the low-power wireless circuitry 1140. In other examples, other low power communication systems may be used.

The high-speed circuitry 1132 includes a high-speed processor 1142, a memory 1144, and a high-speed wireless circuitry 1146. The high-speed processor 1142 may be any processor capable of managing high-speed communications and operation of any general computing system needed for the data processor 1114. The high-speed processor 1142 includes processing resources needed for managing high-speed data transfers on the high-speed wireless connection 1112 using the high-speed wireless circuitry 1146. In certain examples, the high-speed processor 1142 executes an operating system such as a LINUX operating system or other such operating system such as the operating system 1204 of FIG. 12. In addition to any other responsibilities, the high-speed processor 1142 executing a software architecture for the data processor 1114 is used to manage data transfers with the high-speed wireless circuitry 1146. In certain examples, the high-speed wireless circuitry 1146 is configured to implement Institute of Electrical and Electronic Engineers (IEEE) 802.11 communication standards, also referred to herein as Wi-Fi. In other examples, other high-speed communications standards may be implemented by the high-speed wireless circuitry 1146.

The memory 1144 includes any storage device capable of storing camera data generated by the cameras 1118 and the image processor 1124. While the memory 1144 is shown as integrated with the high-speed circuitry 1132, in other examples, the memory 1144 may be an independent standalone element of the data processor 1114. In certain such examples, electrical routing lines may provide a connection through a chip that includes the high-speed processor 1142 from image processor 1124 or the low-power processor 1138 to the memory 1144. In other examples, the high-speed processor 1142 may manage addressing of the memory 1144 such that the low-power processor 1138 will boot the high-speed processor 1142 any time that a read or write operation involving the memory 1144 is needed.

The tracking module 1128 estimates a pose of the networked device 1102. For example, the tracking module 1128 uses image data and corresponding inertial data from the cameras 1118 and the position components 1308 of the scooter 300, glasses 100 or the user device 404 as well as GPS data, to track a location and determine a pose of the networked device 1102 relative to a frame of reference (e.g., real-world environment). The tracking module 1128 continually gathers and uses updated sensor data describing movements of the networked device 1102 to determine updated three-dimensional poses of the networked device 1102 that indicate changes in the relative position and orientation relative to physical objects in the real-world environment.

In the glasses 100 implementation of the networked device 1102, the tracking module 1128 permits visual placement of virtual objects relative to physical objects by the networked device 1102 within the field of view of the user via the displays 1116. The GPU & display driver 1126 may use the pose of the networked device 1102 or the second networked device 1104 to generate frames of virtual content or other content to be presented on the displays 1116 when the networked device 1102 is functioning in a traditional augmented reality mode. In this mode, the GPU & display driver 1126 generates updated frames of virtual content based on updated three-dimensional poses of the networked device 1102 and/or the second networked device 1104, which reflect changes in the position and orientation of the user in relation to physical objects in the user's real-world environment.

One or more functions or operations described herein may also be performed in an application resident on the networked device 1102, on the second networked device 1104, or a server system 1108. For example, one or more functions or operations described herein may be performed by one of the applications 1206 such as messaging application 1208.

Figure 12:
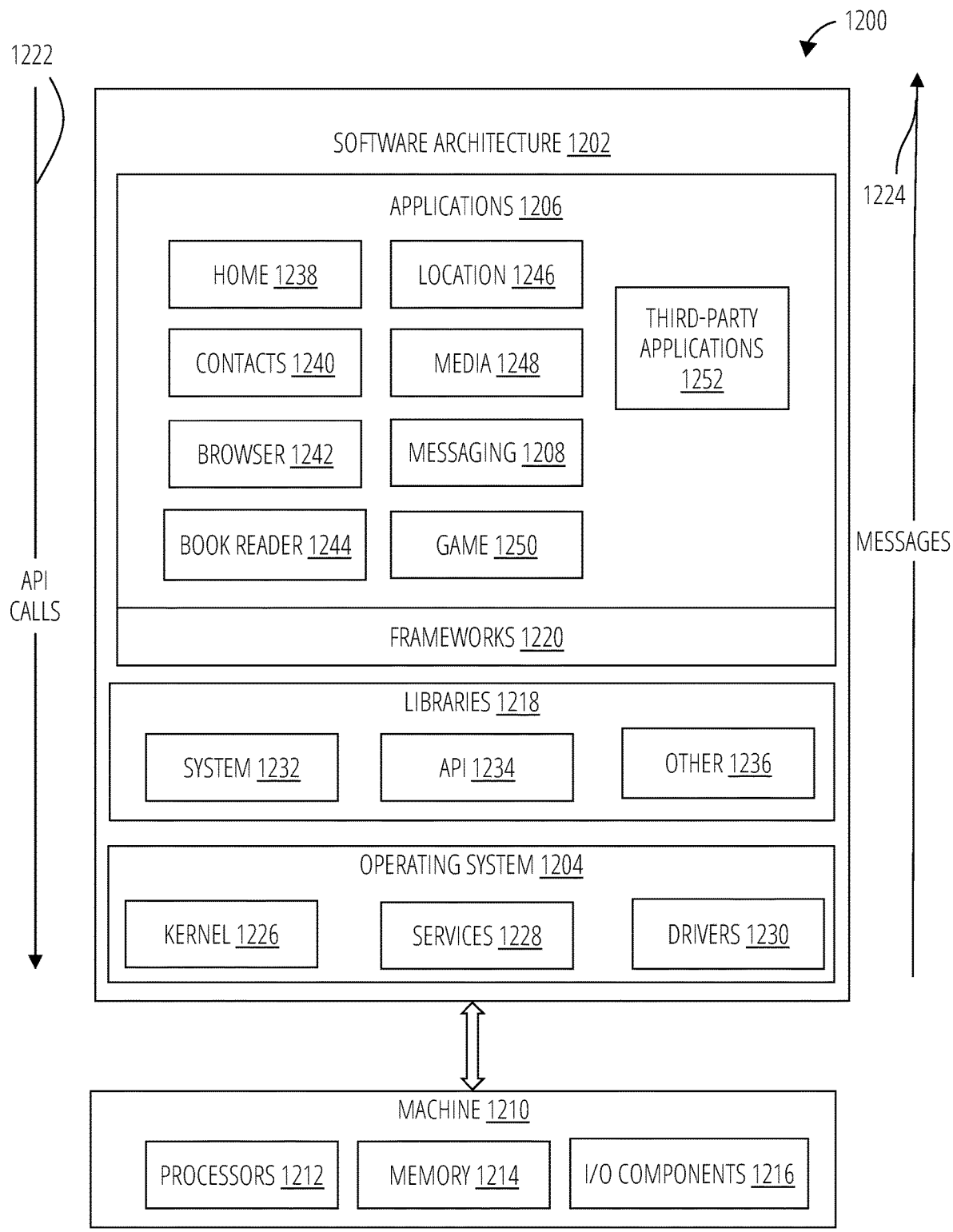
FIG. 12 is a block diagram showing a software architecture within which the present disclosure may be implemented, in accordance with some examples.

FIG. 12 is a block diagram 1200 illustrating a software architecture 1202, which can be installed on any one or more of the devices described herein. The software architecture 1202 is supported by hardware such as a machine 1210 that includes processors 1212, memory 1214, and I/O components 1216. In this example, the software architecture 1202 can be conceptualized as a stack of layers, where each layer provides a particular functionality. The software architecture 1202 includes layers such as an operating system 1204, libraries 1218, frameworks 1220, and applications 1206. Operationally, the applications 1206 invoke API calls 1222 through the software stack and receive messages 1224 in response to the API calls 1222.

The operating system 1204 manages hardware resources and provides common services. The operating system 1204 includes, for example, a kernel 1226, services 1228, and drivers 1230. The kernel 1226 acts as an abstraction layer between the hardware and the other software layers. For example, the kernel 1226 provides memory management, processor management (e.g., scheduling), component management, networking, and security settings, among other functionalities. The services 1228 can provide other common services for the other software layers. The drivers 1230 are responsible for controlling or interfacing with the underlying hardware. For instance, the drivers 1230 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1218 provide a low-level common infrastructure used by the applications 1206. The libraries 1218 can include system libraries 1232 (e.g., C standard library) that provide functions such as memory allocation functions, string manipulation functions, mathematic functions, and the like. In addition, the libraries 1218 can include API libraries 1234 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1218 can also include a wide variety of other libraries 1236 to provide many other APIs to the applications 1206.

The frameworks 1220 provide a high-level common infrastructure that is used by the applications 1206. For example, the frameworks 1220 provide various graphical user interface (GUI) functions, high-level resource management, and high-level location services. The frameworks 1220 can provide a broad spectrum of other APIs that can be used by the applications 1206, some of which may be specific to a particular operating system or platform.

In an example, the applications 1206 may include a home application 1238, a contacts application 1240, a browser application 1242, a book reader application 1244, a location application 1246, a media application 1248, a messaging application 1208, a game application 1250, and a broad assortment of other applications such as third-party applications 1252. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the third-party applications 1252 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 1252 can invoke the API calls 1222 provided by the operating system 1204 to facilitate functionality described herein.

Figure 13:
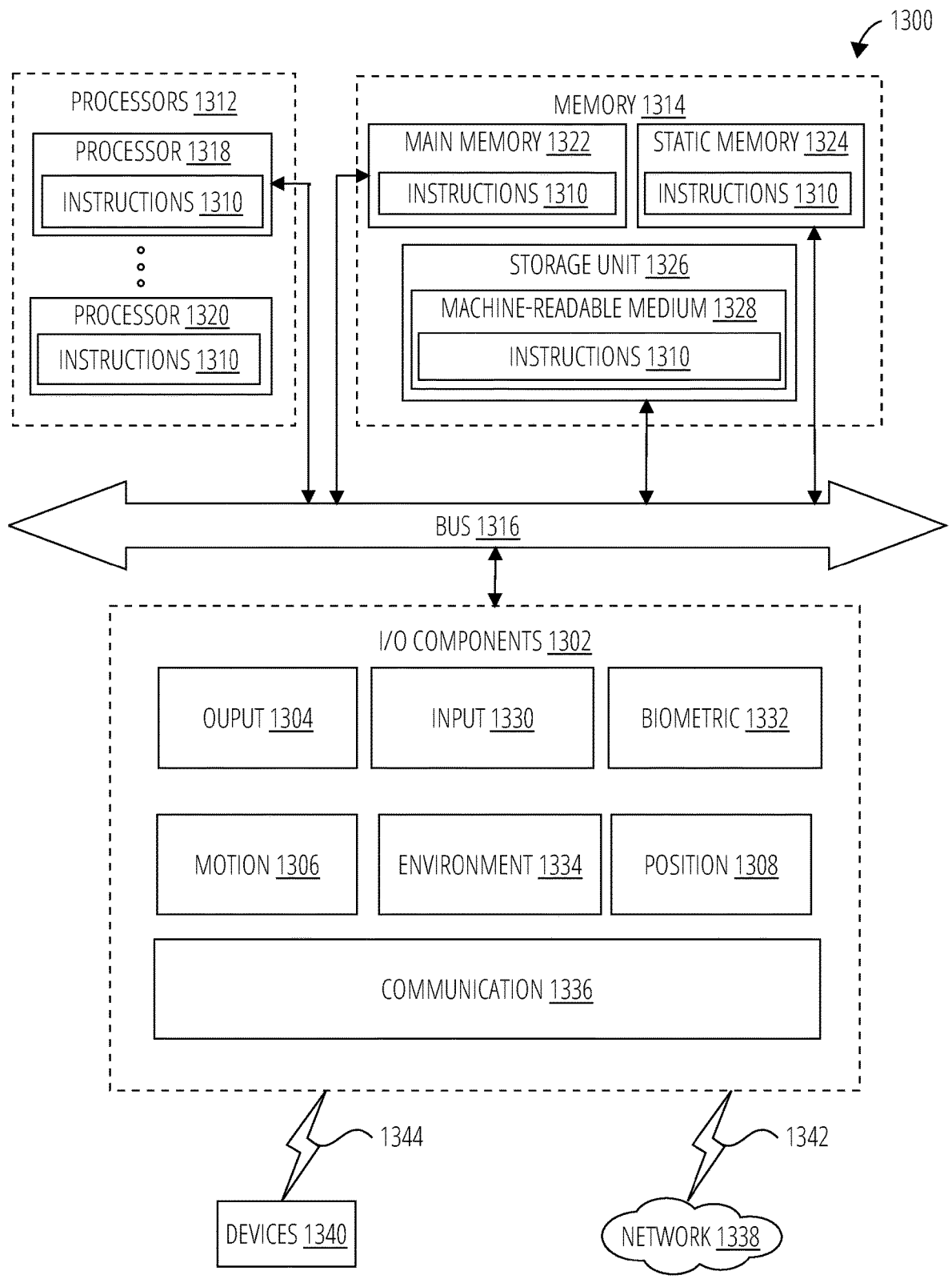
FIG. 13 is a diagrammatic representation of a machine, in the form of a computer system within which a set of instructions may be executed for causing the machine to perform any one or more of the methodologies discussed, in accordance with some examples.

FIG. 13 is a diagrammatic representation of a machine 1300 within which instructions 1310 (e.g., software, a program, an application, an applet, an app, or other executable code) for causing the machine 1300 to perform any one or more of the methodologies discussed herein may be executed. For example, the instructions 1310 may cause the machine 1300 to execute any one or more of the methods described herein. The instructions 1310 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a AR wearable device (e.g., a smart watch), a smart home device (e.g., a smart appliance), other smart devices, a web appliance, a network router, a network switch, a network bridge, or any machine capable of executing the instructions 1310, sequentially or otherwise, that specify actions to be taken by the machine 1300. Further, while only a single machine 1300 is illustrated, the term "machine" shall also be taken to include a collection of machines that individually or jointly execute the instructions 1310 to perform any one or more of the methodologies discussed herein.

The machine 1300 may include processors 1312, memory 1314, and I/O components 1302, which may be configured to communicate with each other via a bus 1316. In an example, the processors 1312 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1318 and a processor 1320 that execute the instructions 1310. The term "processor" is intended to include multi-core processors that may comprise two or more independent processors (sometimes referred to as "cores") that may execute instructions contemporaneously. Although FIG. 13 shows multiple processors 1312, the machine 1300 may include a single processor with a single core, a single processor with multiple cores (e.g., a multi-core processor), multiple processors with a single core, multiple processors with multiples cores, or any combination thereof.

The memory 1314 includes a main memory 1322, a static memory 1324, and a storage unit 1326, both accessible to the processors 1312 via the bus 1316. The main memory 1314, the static memory 1324, and storage unit 1326 store the instructions 1310 embodying any one or more of the methodologies or functions described herein. The instructions 1310 may also reside, completely or partially, within the main memory 1322, within the static memory 1324, within machine-readable medium 1328 within the storage unit 1326, within at least one of the processors 1312 (e.g., within the processor's cache memory), or any suitable combination thereof, during execution thereof by the networked device 1102.

The I/O components 1302 may include a wide variety of components to receive input, provide output, produce output, transmit information, exchange information, capture measurements, and so on. The specific I/O components 1302 that are included in a particular machine will depend on the type of machine. For example, portable machines such as mobile phones may include a touch input device or other such input mechanisms, while a headless server machine will likely not include such a touch input device. It will be appreciated that the I/O components 1302 may include many other components that are not shown in FIG. 13. In various examples, the I/O components 1302 may include output components 1304 and input components 1330. The output components 1304 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1330 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 1302 may include biometric components 1332, motion components 1306, environmental components 1334, or position components 1308, among a wide array of other components. For example, the biometric components 1332 include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 1306 include acceleration sensor components (e.g., accelerometer), gravitation sensor components, rotation sensor components (e.g., gyroscope), and so forth. The environmental components 1334 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1308 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1302 further include communication components 1336 operable to couple the networked device 1102 to a network 1338 or devices 1340 via a coupling 1342 and a coupling 1344, respectively. For example, the communication components 1336 may include a network interface component or another suitable device to interface with the network 1338. In further examples, the communication components 1336 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1340 may be another machine or any of a wide variety of peripheral devices (e.g., a peripheral device coupled via a USB).

Moreover, the communication components 1336 may detect identifiers or include components operable to detect identifiers. For example, the communication components 1336 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1336, such as location via Internet Protocol (IP) geolocation, location via Wi-Fi® signal triangulation, location via detecting an NFC beacon signal that may indicate a particular location, and so forth.

The various memories (e.g., memory 1314, main memory 1322, static memory 1324, and/or memory of the processors 1312) and/or storage unit 1326 may store one or more sets of instructions and data structures (e.g., software) embodying or used by any one or more of the methodologies or functions described herein. These instructions (e.g., the instructions 1310), when executed by processors 1312, cause various operations to implement the disclosed examples.

The instructions 1310 may be transmitted or received over the network 1338, using a transmission medium, via a network interface device (e.g., a network interface component included in the communication components 1336) and using any one of a number of well-known transfer protocols (e.g., hypertext transfer protocol (HTTP)). Similarly, the instructions 1310 may be transmitted or received using a transmission medium via the coupling 1344 (e.g., a peer-to-peer coupling) to the devices 1340.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "client device" or "user device" refers to any machine that interfaces to a communications network to obtain resources from one or more server systems or other client or user devices. A client or user device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

A "computer-readable medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

An "ephemeral message" refers to a message that is accessible for a time-limited duration. An ephemeral message may be a text, an image, a video, and the like. The access time for the ephemeral message may be set by the message sender. Alternatively, the access time may be a default setting, or a setting specified by the recipient. Regardless of the setting technique, the message is transitory.

A "machine-storage medium" refers to a single or multiple storage devices and/or media (e.g., a centralized or distributed database, and/or associated caches and servers) that store executable instructions, routines and/or data in a non-transitory manner. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

A "processor" refers to any circuit or virtual circuit (a physical circuit emulated by logic executing on an actual processor) that manipulates data values according to control signals (e.g., "commands", "op codes", "machine code", and so forth) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

Changes and modifications may be made to the disclosed examples without departing from the scope of the present disclosure. These and other changes or modifications are intended to be included within the scope of the present disclosure, as expressed in the following claims.

The invention claimed is:

1. A method, performed by one or more computer processors, for displaying content to a user of a vehicle wearing a head-worn augmented reality device, the method comprising:
   displaying a first degree of content using the head-worn augmented reality device;
   detecting, by the vehicle using a sensor located on or in the vehicle, an increased level of risk indicated by manipulation of a control of the vehicle by a user;
   receiving, by the head-worn augmented reality device, a notification of the increased level of risk transmitted from the vehicle based on detecting the manipulation of the control of the vehicle by a user; and
   based on receiving the notification of an increased level of risk based on detecting the manipulation of the control of the vehicle by the user, displaying a second degree of content using the head-worn augmented reality device, the second degree of content being less than the first degree of content.

2. The method of claim 1, wherein the content does not relate to vehicle operation or navigation.

3. The method of claim 1, wherein the detection of the manipulation of the control using the sensor located on or in the vehicle comprises detecting a sharp application of a steering control or a brake control by the user.

4. The method of claim 1, wherein displaying the second degree of content comprises:
   moving one or more content elements out of a central field of view of the head-worn augmented reality device.

5. The method of claim 4 wherein moving the one or more content elements out of the central field of view comprises:
   moving one or more content elements upwards or downwards in a field of view of the head-worn augmented reality device.

6. The method of claim 1, wherein displaying the second degree of content comprises:

reducing a size or a visual characteristic of a content element shown in the display of the first degree of content.

7. The method of claim 1, wherein displaying the second degree of content comprises:
eliminating a content element shown in the display of the first degree of content.

8. A computing apparatus for displaying content to a user of a vehicle wearing a head-worn augmented reality device, the computing apparatus comprising:
one or more computer processors; and
one or more memories storing instructions that, when executed by the one or more computer processors, configure the computing apparatus to perform operations comprising:
displaying a first degree of content using the head-worn augmented reality device;
detecting, by the vehicle using a sensor located on or in the vehicle, an increased level of risk indicated by manipulation of a control of the vehicle by a user;
receiving, by the head-worn augmented reality device, a notification of the increased level of risk transmitted from the vehicle based on detecting the manipulation of the control of the vehicle by a user; and
based on receiving the notification of an increased level of risk based on detecting the manipulation of the control of the vehicle by the user, displaying a second degree of content using the head-worn augmented reality device, the second degree of content being less than the first degree of content.

9. The computing apparatus of claim 8 wherein the content does not relate to vehicle operation or navigation.

10. The computing apparatus of claim 8, wherein the detection of the manipulation of the control using the sensor located on or in the vehicle comprises detecting a sharp application of a steering control or a brake control by the user.

11. The computing apparatus of claim 8, wherein displaying the second degree of content comprises:
moving one or more content elements out of a central field of view of the head-worn augmented reality device.

12. The computing apparatus of claim 11, wherein moving the one or more content elements out of the central field of view comprises:
moving one or more content elements upwards or downwards in a field of view of the head-worn augmented reality device.

13. The computing apparatus of claim 11, wherein displaying the second degree of content comprises:
reducing a size or a visual characteristic of a content element shown in the display of the first degree of content.

14. The computing apparatus of claim 11, wherein displaying the second degree of content comprises:
eliminating a content element shown in the display of the first degree of content.

15. A non-transitory computer-readable storage medium, the computer-readable storage medium including instructions that when executed by one or more computer processors of one or more computing devices, cause the one or more computing devices to perform operations for displaying content to a user of a vehicle wearing a head-worn augmented reality device, the operations comprising:
displaying a first degree of content using the head-worn augmented reality device;
detecting, by the vehicle using a sensor located on or in the vehicle, an increased level of risk indicated by manipulation of a control of the vehicle by a user;
receiving, by the head-worn augmented reality device, a notification of the increased level of risk transmitted from the vehicle based on detecting the manipulation of the control of the vehicle by a user; and
based on receiving the notification of an increased level of risk based on detecting the manipulation of the control of the vehicle by the user, displaying a second degree of content using the head-worn augmented reality device, the second degree of content being less than the first degree of content.

16. The non-transitory computer-readable storage medium of claim 15, wherein the content does not relate to vehicle operation or navigation.

17. The non-transitory computer-readable storage medium of claim 15, wherein the detection of the manipulation of the control using the sensor located on or in the vehicle comprises detecting a sharp application of a steering control or a brake control by the user.

18. The non-transitory computer-readable storage medium of claim 15, wherein displaying the second degree of content comprises moving one or more content elements upwards or downwards in a field of view of the head-worn augmented reality device.

19. The non-transitory computer-readable storage medium of claim 15, wherein displaying the second degree of content comprises:
reducing a size or a visual characteristic of a content element shown in the display of the first degree of content.

20. The non-transitory computer-readable storage medium of claim 19 wherein displaying the second degree of content comprises:
eliminating a content element shown in the display of the first degree of content.

* * * * *